United States Patent
Ezrielev et al.

(10) Patent No.: US 12,411,710 B2
(45) Date of Patent: Sep. 9, 2025

(54) SYSTEM AND METHOD FOR INFERENCE GENERATION THROUGH DYNAMIC REASSIGNMENT OF INFERENCE MODEL PORTIONS

(71) Applicant: Dell Products L.P., Round Rock, TX (US)

(72) Inventors: Ofir Ezrielev, Beer Sheva (IL); Avitan Gefen, Tel Aviv (IL); Nadav Azaria, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 703 days.

(21) Appl. No.: 17/862,983

(22) Filed: Jul. 12, 2022

(65) Prior Publication Data

US 2024/0020555 A1    Jan. 18, 2024

(51) Int. Cl.
  *G06F 9/48* (2006.01)
  *G06F 9/50* (2006.01)
  *G06N 3/045* (2023.01)

(52) U.S. Cl.
  CPC .............. *G06F 9/4881* (2013.01); *G06F 9/48* (2013.01); *G06F 9/4806* (2013.01); *G06F 9/4843* (2013.01); *G06F 9/485* (2013.01); *G06F 9/4868* (2013.01); *G06F 9/50* (2013.01); *G06F 9/5038* (2013.01); *G06F 9/5083* (2013.01); *G06N 3/045* (2023.01)

(58) Field of Classification Search
  CPC ........ G06F 9/48; G06F 9/4806; G06F 9/4843; G06F 9/485; G06F 9/4868; G06F 9/4881; G06F 9/50; G06F 9/5038; G06F 9/5083; G06N 3/045
  See application file for complete search history.

(56) References Cited

U.S. PATENT DOCUMENTS

| | | | |
|---|---|---|---|
| 7,877,627 B1 * | 1/2011 | Freydel | G06F 11/1633 714/11 |
| 10,540,202 B1 | 1/2020 | Smaldone | |

(Continued)

OTHER PUBLICATIONS

Pearl, Judea. "Causal inference in statistics: An overview." Statistics surveys 3 (2009): 96-146. https://projecteuclid.org/journals/statistics-surveys/volume-3/issue-none/Causal-inference-in-statistics-An-overview/10.1214/09-SS057.short.

(Continued)

*Primary Examiner* — Charles M Swift
(74) *Attorney, Agent, or Firm* — WOMBLE BOND DICKINSON (US) LLP

(57) ABSTRACT

Methods and systems for inference generation are disclosed. To manage inference generation, a system may include an inference model manager and any number of data processing systems. The inference model manager may partition an inference model into portions. Portions of the inference model may be distributed to data processing systems in accordance with an execution plan. The execution plan may include instructions for timely execution of the inference model with respect to the needs of a downstream consumer. The inference model manager may manage execution of the inference model by monitoring the functionality of the data processing systems and dynamically re-assigning and/or re-locating data processing systems in the event that one or more data processing systems becomes unable to execute a portion of the inference model.

20 Claims, 18 Drawing Sheets

(56) References Cited

U.S. PATENT DOCUMENTS

| | | | |
|---|---|---|---|
| 12,242,928 B1 | | 3/2025 | Chen |
| 2018/0349235 A1* | | 12/2018 | Freydel ................ G06F 11/182 |
| 2019/0182055 A1 | | 6/2019 | Christidis |
| 2020/0005135 A1* | | 1/2020 | Che ........................ G06N 3/084 |
| 2020/0019393 A1 | | 1/2020 | Vichare et al. |
| 2021/0117859 A1 | | 4/2021 | Rogers et al. |
| 2022/0383149 A1 | | 12/2022 | Cao et al. |
| 2022/0414503 A1* | | 12/2022 | Park ..................... G06F 9/4881 |
| 2023/0090941 A1 | | 3/2023 | Li |
| 2023/0128271 A1* | | 4/2023 | Liu ........................ G06N 3/063 |
| | | | 706/12 |
| 2024/0020510 A1 | | 1/2024 | Ezrielev |
| 2024/0020550 A1 | | 1/2024 | Ezrielev |
| 2024/0177028 A1 | | 5/2024 | Ezrielev |
| 2024/0220831 A1 | | 7/2024 | Wyman |

OTHER PUBLICATIONS

Xie, Yaochen, et al. "Self-supervised learning of graph neural networks: A unified review." IEEE Transactions on Pattern Analysis and Machine Intelligence (2022). https://ieeexplore.ieee.org/abstract/document/9764632/.

Kumar, Manoj, et al. "Genetic algorithm: Review and application." Available at SSRN 3529843 (2010). https://papers.ssrn.com/sol3/papers.cfm?abstract_id=3529843.

Gholami, Amir, et al. "A survey of quantization methods for efficient neural network inference." arXiv preprint arXiv:2103.13630 (2021). https://arxiv.org/abs/2103.13630.

Blalock, Davis, et al. "What is the state of neural network pruning?." Proceedings of machine learning and systems 2 (2020): 129-146. https://proceedings.mlsys.org/book/296.pdf.

* cited by examiner

SYSTEM AND METHOD FOR INFERENCE GENERATION THROUGH DYNAMIC REASSIGNMENT OF INFERENCE MODEL PORTIONS

FIELD

Embodiments disclosed herein relate generally to inference generation. More particularly, embodiments disclosed herein relate to systems and methods to generate inferences across multiple data processing systems throughout a distributed environment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements

DETAILED DESCRIPTION

Figure 1:
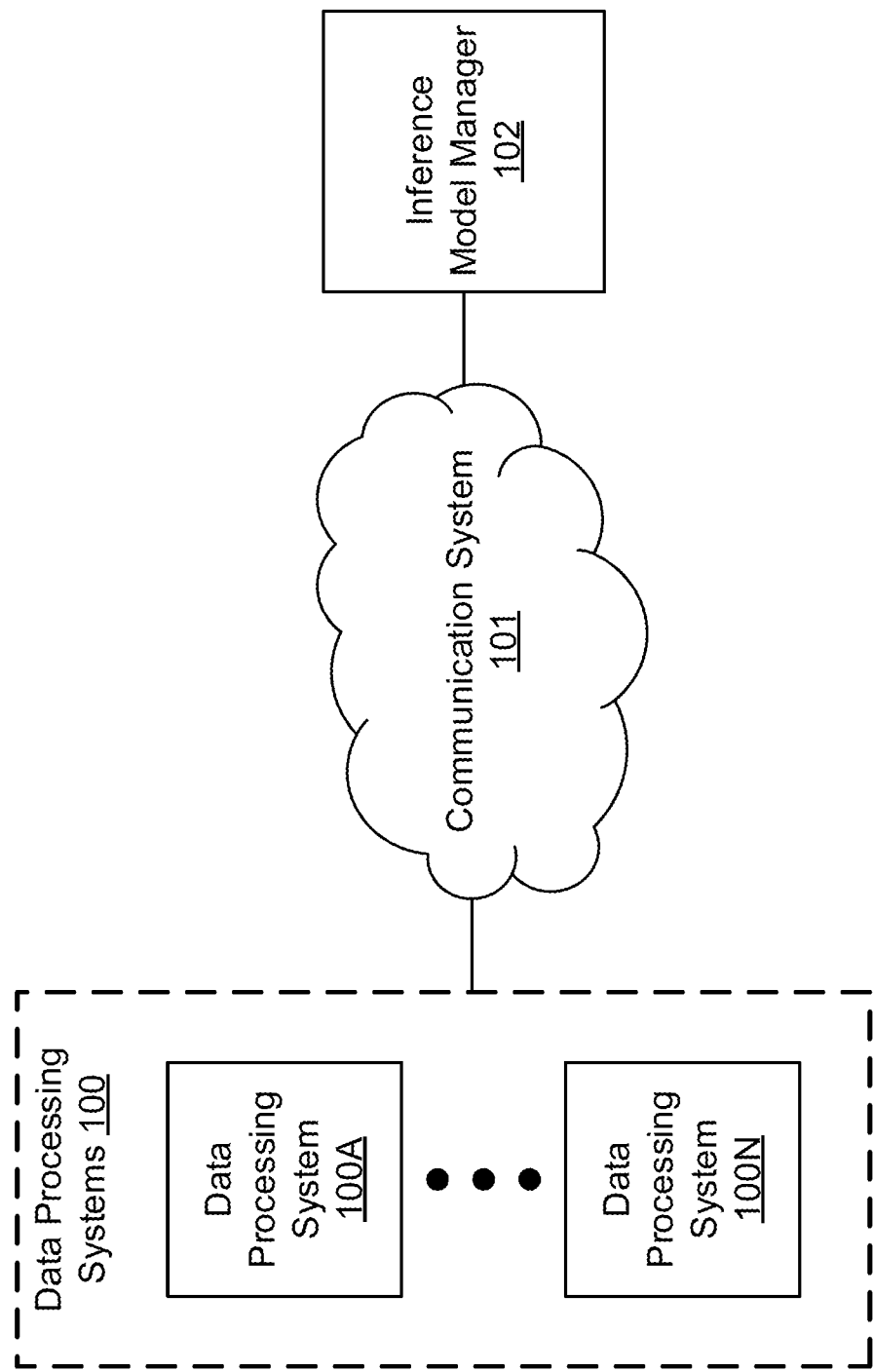
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for inference generation throughout a distributed environment. To manage inference generation, the system may include an inference model manager and any number of data processing systems. Hosting and executing an inference model by one data processing system may consume undesirable quantities of computing resources of the data processing system (and/or the data processing system may include insufficient resources to host the inference model).

In order to reduce computing resource consumption, the inference model manager may partition the inference model into portions and distribute the portions across multiple data processing systems. Following distribution of the portions of the inference model, the data processing systems may operate in potentially adverse environmental conditions. Exposure to adverse environmental conditions may result in termination of one or more of the data processing systems thereby deactivating one or more portions of the inference model. For example, the data processing systems may operate outdoors in an environment that may expose the data processing systems to unpredictable conditions (e.g., weather patterns, wildlife, etc.).

To partially address the potential loss of portions of an inference model, the portions of the inference model may be redundantly deployed to multiple data processing systems such that multiple copies of some or all of the portions of the inference model are redundantly hosted by different data processing systems. By doing so, the inference model may continue to operate in the event of termination of one of the data processing systems through redundancy. However, redundancy may not provide an adaptable solution in the event that multiple (e.g., several and/or all) copies of a portion of the inference model may be rendered inoperable.

To further reduce the likelihood of the operation of the inference model being impacted by inoperability of the hosted portions of the inference model, a management framework for the portions of the inference model may be enforced that provides flexibility to dynamically re-assign data processing systems (e.g., distribute additional portions of the inference model) to remain in compliance with the needs of a downstream consumer (which may change over time). The downstream consumer of the inferences may be the data processing systems themselves, a unique data processing system configured to consume inferences generated by the inference model, and/or any other entity throughout the distributed environment.

In order to manage execution of the inference model portions in accordance with the management framework, the inference model manager may distribute the portions of the inference model to data processing systems in accordance with an execution plan. The execution plan may facilitate timely execution of the inference model with respect to the needs of the downstream consumer.

The execution plan may indicate a quantity of instances (e.g., copies) of each portion of the inference model that may be hosted by the data processing systems and an execution location (e.g., a geographic distribution) of the portions of the inference model. The execution plan may also indicate an acknowledgement schedule for the data processing systems to check in with (e.g., transmit an acknowledgment of functionality to) the inference model manager. The execution plan may also include, in the event that the inference model may not match the needs of the downstream consumer, a compliance standard indicating a maximum duration of time for the distribution of the additional copies of the portions of the inference model (to re-establish compliance with the needs of the downstream consumer).

In order to maintain compliance of the inference model with the execution plan, the inference model manager may attempt to obtain acknowledgements from the data processing systems to obtain an updated listing of the distribution and quantity of the data processing systems, and portions of the inference model hosted thereby. The inference model manager may determine whether the updated listing and corresponding hosted portions of the inference model match the execution plan. If the updated listing does not match the execution plan, the inference model manager may revise the execution plan and distribute the revised execution plan to the data processing systems in an attempt to meet the needs (e.g., a level of assurance with respect to continued operation of the inference model for inference generation relied upon by the downstream consumer) of the downstream consumer. Revising the execution plan may include re-assignment of one or more of the data processing systems in terms of the portion of the inference model hosted by the data processing systems and/or the geographic location of the data processing systems.

Thus, embodiments disclosed herein may provide an improved system for managing use of the limited resources of a distributed environment. The improved system may deploy an inference model across multiple data processing systems and respond to changes in the availability of the data processing systems. By managing the deployment of the inference model, a system in accordance with embodiments disclosed herein may re-assign and/or re-distribute portions of the inference model to data processing systems in order to remain in compliance with the needs of a downstream consumer such that downstream consumers may more assuredly rely on the services provided by the inference model. By doing so, inference model performance may be adjusted dynamically and functionality of the inference model may be maintained during disruptions to the data processing systems and/or changes to the needs of a downstream consumer.

In an embodiment, a method for executing an inference model across multiple data processing systems that each individually have insufficient computing resources to complete timely execution of the inference model is provided.

The method may include initiating execution of an inference model using portions of the inference model distributed to the data processing systems to obtain an inference model result, at least two of the portions of the inference model generating redundant processing results as specified by an execution plan for the inference model to facilitate continued execution of the inference model in an event of termination of a host of one of the at least two of the portions of the inference model; while the inference model is executing and at least one of the data processing systems becomes unable to complete execution of one of the distributed portions of the inference model: managing the execution of the inference model based on the execution plan and through, at least in part, distribution of additional copies of the portions of the inference model to the data processing systems to provide eventual compliance with the execution plan and through which the inference model result is timely obtained, the timely obtained inference model result being relied upon by a downstream consumer for operation.

The method may also include: prior to initiating the execution of the inference model: obtaining the inference model; identifying characteristics of the data processing systems; obtaining the portions of the inference model based on the characteristics of the data processing systems and characteristics of the inference model; obtaining the execution plan based on: the portions of the inference model, the characteristics of the data processing systems, and requirements of the downstream consumer with respect to the inference model result; and distributing the portions of the inference model to the data processing systems based on the execution plan.

The execution plan may indicate: an assurance level for each of the portions of the inference model; and an execution location for each of the portions of the inference model.

The assurance level may indicate a quantity of instances of a corresponding portion of the portions of the inference model that are to be hosted by the data processing systems.

The execution location for each of the portions of the inference model may be selected to reduce geographic clustering of redundant instances of the portions of the inference model.

The execution plan may also indicate an acknowledgement schedule for the data processing systems.

The execution plan may also indicate a compliance standard for deviation of the portions of the inference model from the execution plan.

The compliance standard may indicate a maximum duration of time for the distribution of the additional copies of the portions of the inference model.

Managing the execution of the inference model may include: attempting to obtain an acknowledgement from each of the data processing systems to obtain an updated listing of a distribution and a quantity of the data processing systems; making a determination regarding whether the updated listing of the distribution and the quantity of the data processing systems matches the execution plan; in an instance where the determination indicates that the updated listing does not match the execution plan: obtaining a revised execution plan based on the updated listing, and distributing one or more of the portions of the inference model based on the revised execution plan.

The revised execution plan may indicate a change in assignment of one of the data processing systems to support execution of the distributed one or more of the portions of the inference model.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize inferences generated by executing an inference model across multiple data processing systems throughout a distributed environment.

The system may include inference model manager 102. Inference model manager 102 may provide all, or a portion, of the computer-implemented services. For example, inference model manager 102 may provide computer-implemented services to users of inference model manager 102 and/or other computing devices operably connected to inference model manager 102. The computer-implemented services may include any type and quantity of services which may utilize, at least in part, inferences generated by an inference model executed across multiple data processing systems throughout a distributed environment.

For example, inference model manager 102 may be used as part of a quality control system in which inferences generated using an inference model are used to make quality control decisions regarding a product. An inference model may be executed across multiple data processing systems which collectively may generate the inferences. In an industrial environment, for example, inference model manager 102 may distribute portions of an inference model to a variety of data processing systems (e.g., devices with available computing resources such as temperature sensors, assembly line controllers, etc.) which may collectively generate an inference regarding the success or failure of a product to meet quality control standards. In the event that one of the data processing systems is terminated or otherwise loses functionality, inference model manager may dynamically re-assign and/or re-distribute portions of the inference model to the remaining data processing systems in order to remain in compliance with the needs of a downstream consumer of the inferences. Inference model manager 102 may be utilized in other types of environments without departing from embodiments disclosed herein.

To facilitate execution of inference models across multiple data processing systems, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the execution of inference models.

For example, all, or a portion, of the data processing systems 100 may provide computer-implemented services to users and/or other computing devices operably connected to data processing systems 100. The computer-implemented services may include any type and quantity of services including, for example, generation of a partial or complete processing result using a portion of an inference model. Different data processing systems may provide similar and/or different computer-implemented services.

Inferences generated by inference models may be utilized in order to provide computer-implemented services to downstream consumers of the services. However, the quality of the computer-implemented services may be dependent on the accuracy of the inferences and, therefore, the complexity of the inference model. An inference model capable of generating accurate inferences may consume an undesirable quantity of computing resources during operation. The addition of a data processing system dedicated to hosting and operating the inference model may increase communication bandwidth consumption, power consumption, and/or computational overhead throughout the distributed environment. Therefore, an inference model may be partitioned into portions and distributed across multiple data processing systems in order to more efficiently utilize available computing resources throughout a distributed environment. However, the functionality of the inference model may be vulnerable to termination and/or diminished functionality of one or more of the data processing systems responsible for hosting the inference model. In the event of termination and/or diminished functionality of one or more data processing systems, the inference model may no longer be in compliance with the needs of a downstream consumer of the inferences.

In general, embodiments disclosed herein may provide methods, systems, and/or devices for managing execution of an inference model across multiple data processing systems that each individually have insufficient computing resources to complete timely execution of the inference model. To manage execution of the inference model across multiple data processing systems, a system in accordance with an embodiment may distribute portions of the inference model according to an execution plan. The execution plan may include instructions for timely execution of the inference model with respect to the needs of a downstream consumer of the inferences. In the event that at least one of the data processing systems becomes unable to complete execution of one of the distributed portions of the inference model, data processing systems may be dynamically re-assigned and/or re-located. By doing so, an inference model may continue to generate inferences in compliance with the needs of a downstream consumer.

To provide its functionality, inference model manager 102 may (i) obtain portions of an inference model, (ii) obtain an execution plan for the inference model, (iii) distribute portions of the inference model to data processing systems 100, (iv) initiate execution of the inference model, and/or (v) manage the execution of the inference model.

To obtain portions of an inference model, inference model manager 102 may generate (or otherwise obtain) an inference model. The inference model may be a neural network inference model and/or any other type of inference-generation model. Inference model manager 102 may partition the inference model into portions such that the computing resources required to host and operate each portion may fall within the available computing resources of corresponding data processing systems.

Portions of the inference model may be obtained by grouping neurons of a neural network inference model based on shared data dependencies (e.g., parameters such as weights, biases, etc.). In an example embodiment, inference model manager 102 may obtain portions of the inference model by representing the inference model as a bipartite graph. The bipartite graph may include a first set of elements (e.g., nodes) based on parameters of the neural network inference model (e.g., weights, biases, etc.). The bipartite graph may also include a second set of elements based on values of neurons of the neural network inference model. The first set of elements and the second set of elements may be connected by edges on the bipartite graph to indicate which parameters may be associated with each neuron. Portions of the bipartite graph may be obtained by grouping nodes of the bipartite graph that share edges and, therefore, depend on the values of other nodes in the portion.

Portions of the inference model may then be obtained based on the neurons included in each portion of the bipartite graph by determining whether the computing resource expenditure required to host and operate the neurons included in each portion may fall within the capabilities of the corresponding data processing systems. While described above with respect to a bipartite graph, portions of an inference model may be obtained via other methods without departing from embodiments disclosed herein.

In an embodiment, inference model manager 102 may obtain an execution plan for the inference model. The execution plan may include instructions for distribution, management, and/or timely execution of the inference model. The execution plan may be based on the portions of the inference model, the characteristics of the data processing systems, and/or the requirements of a downstream consumer. The execution plan may indicate an assurance level for each of the portions of the inference model, the assurance level indicating a quantity of instances of a corresponding portion of the portions of the inference model that are to be hosted by the data processing systems. In addition, the execution plan may indicate an execution location (and/or a localization pattern over time) for each of the portions of the inference model, the execution location for each of the portions of the inference model being selected in order to reduce geographic clustering of redundant instances of the portions of the inference model. The execution plan may also indicate an acknowledgement schedule for the data processing systems and/or a compliance standard for deviation of the portions of the inference model from the execution plan. The compliance standard may indicate a maximum duration of time for the distribution of the additional copies of the portions of the inference model in order to return to compliance with the needs of a downstream consumer. Refer to FIG. 3B for additional details regarding obtaining an execution plan.

In an embodiment, inference model manager 102 may distribute the portions of the inference model to the data processing systems such that one portion of the inference model may be distributed to each data processing system in accordance with the execution plan. By doing so, the data processing systems may collectively execute the inference model to obtain an inference model result.

In an embodiment, inference model manager 102 may initiate execution of the inference model using the portions of the inference model distributed to the data processing systems to obtain an inference model result. Initiating execution of the inference model may include distributing the execution plan to the data processing systems, obtaining an inference model result from the data processing systems, and/or providing the inference model result to a downstream consumer of the inference model result. At least two of the portions of the inference model may generate redundant processing results as specified by the execution plan for the inference model to facilitate continued execution of the inference model in an event of termination of a host of one of the at least two of the portions of the inference model.

In an embodiment, inference model manager 102 may manage the execution of the inference model. During execution of the inference model, at least one of the data processing systems may become unable to complete execution of one of the distributed portions of the inference model. Managing execution of the inference model may be based on the execution plan and may include, at least in part, distribution of additional copies of the portions of the inference model to the data processing systems to provide eventual compliance with the execution plan and through which the inference model result is timely obtained, the timely obtained inference model result being relied upon by a downstream consumer for operation. Refer to FIG. 3C for additional details regarding managing execution of the inference model.

When performing its functionality, inference model manager 102 may perform all, or a portion, of the methods and/or actions shown in FIGS. 3A-3D.

To provide their functionality, data processing systems 100 may (i) obtain portions of an inference model, (ii) obtain a processing result using the portions of the inference model, (iii) provide the processing result to a user of the processing result, (iv) transmit an acknowledgement of functionality to the inference model manager in a manner detailed by the execution plan, and/or (v) responding to instructions from the inference model manager 102.

When performing their functionality, data processing systems 100 may perform all, or a portion, of the methods and/or actions shown in FIGS. 3A-3D.

Data processing systems 100 and/or inference model manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 6.

In an embodiment, one or more of data processing systems 100 are implemented using an internet of things (IoT) device, which may include a computing device. The IoT device may operate in accordance with a communication model and/or management model known to the inference model manager 102, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
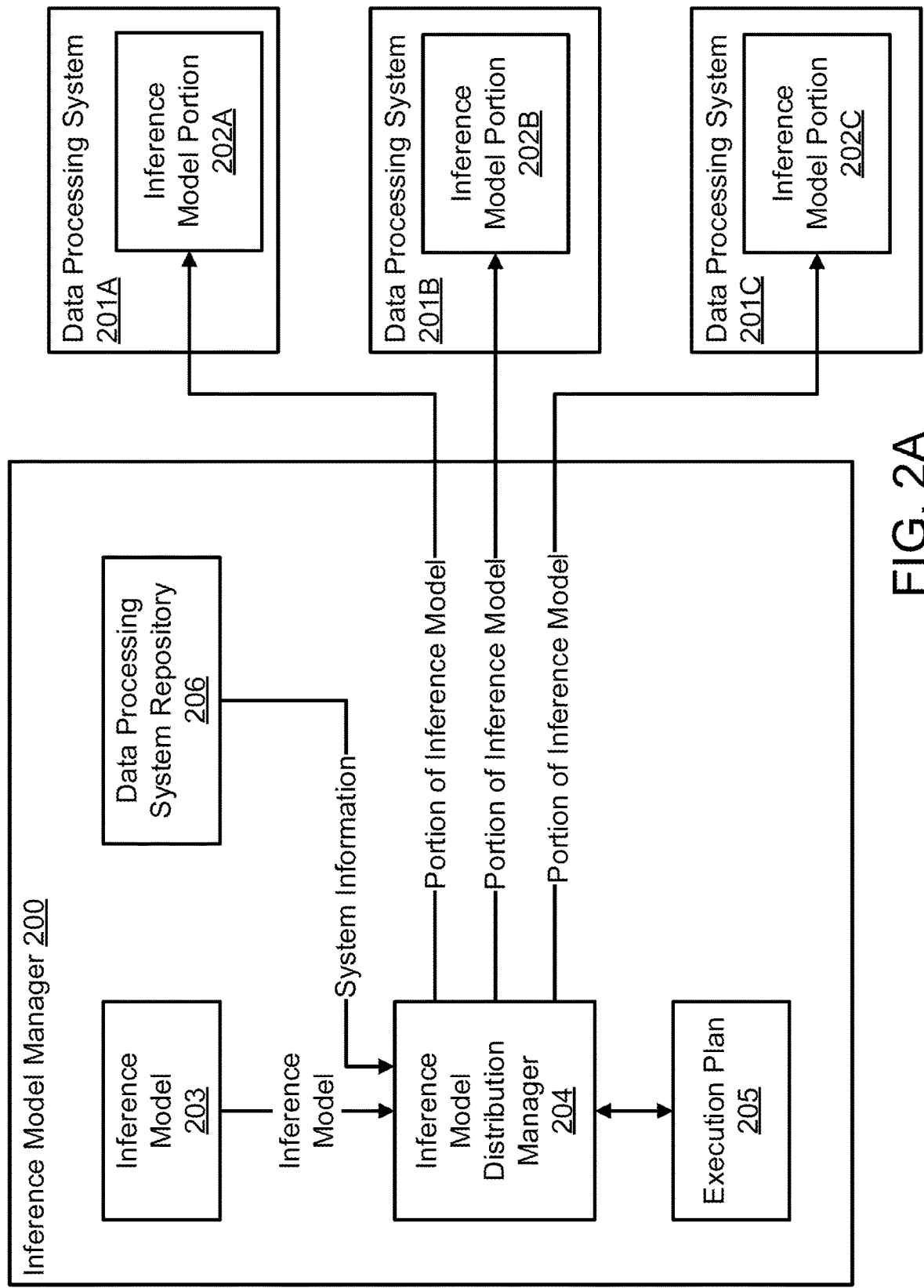
FIG. 2A shows a block diagram illustrating an inference model manager and multiple data processing systems over time in accordance with an embodiment.
Figure 2B:
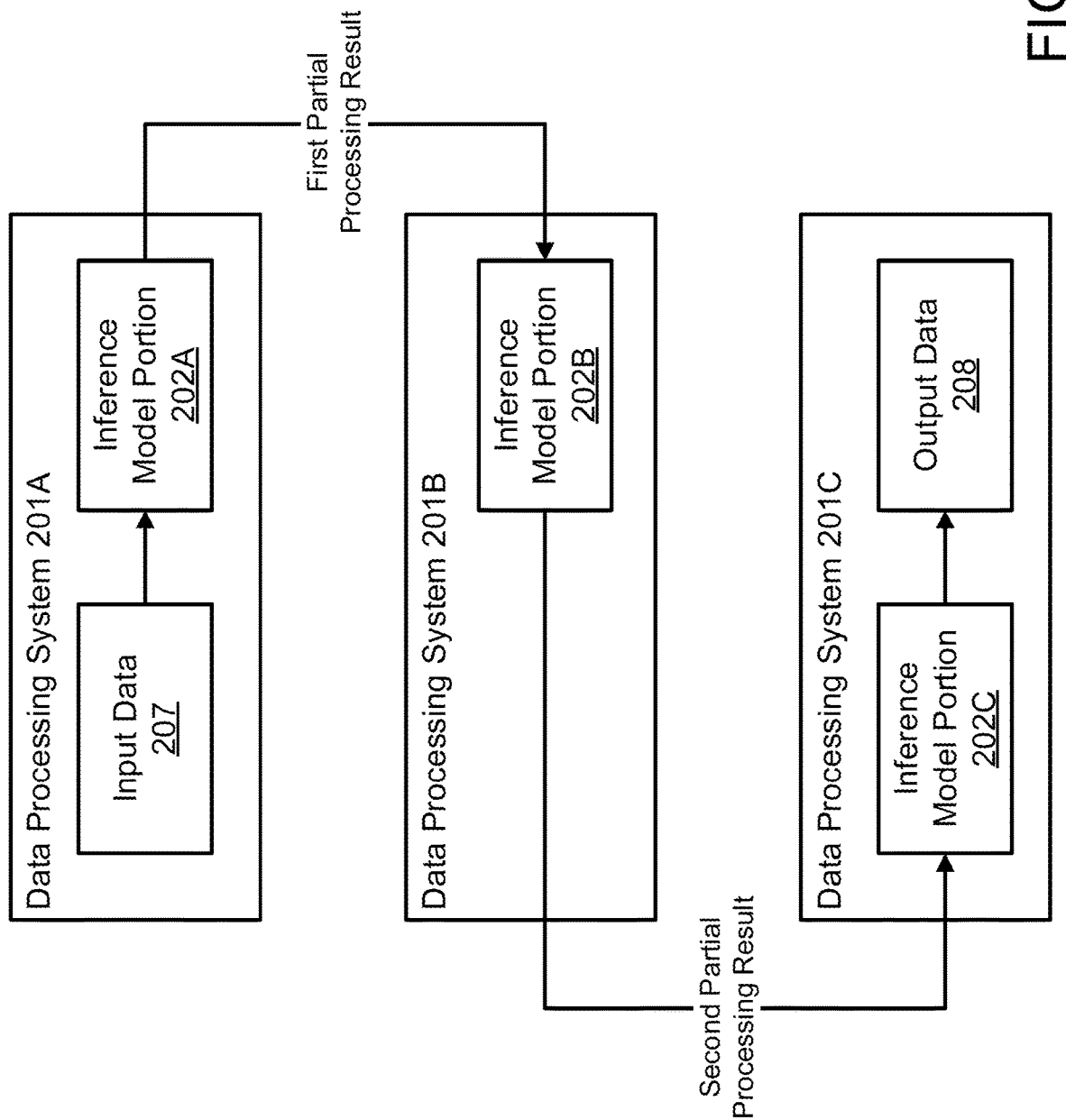
FIG. 2B shows a block diagram illustrating multiple data processing systems over time in accordance with an embodiment.

To further clarify embodiments disclosed herein, diagrams of a system over time in accordance with an embodiment are shown in FIGS. 2A-2B.

Turning to FIG. 2A, a diagram of inference model manager 200 and data processing systems 201A-201C is shown. Inference model manager 200 may be similar to inference model manager 102, and data processing systems 201A-201C may be similar to any of data processing systems 100. In FIG. 2A, inference model manager 200 and data processing systems 201A-201C are connected to each other via a communication system (not shown). Communications between inference model manager 200 and data processing systems 201A-201C are illustrated using lines terminating in arrows.

As discussed above, inference model manager 200 may perform computer-implemented services by executing an inference model across multiple data processing systems that each individually have insufficient computing resources to complete timely execution of the inference model. The computing resources of the individual data processing systems may be insufficient due to: insufficient available storage to host the inference model and/or insufficient processing capability for timely execution of the inference model.

In order to execute the inference model across multiple data processing systems, inference model manager 200 may obtain portions of an inference model and may distribute the portions of the inference model to data processing systems 201A-201C. The portions may be based on: (i) the computing resource availability of the data processing systems 201A-201C and (ii) communication bandwidth availability between the data processing systems. By doing so, inference model manager 200 may distribute the computational overhead and bandwidth consumption associated with hosting and operating the inference model across multiple data processing systems while reducing communications between data processing systems 201A-201C throughout the distributed environment.

In order to obtain portions of the inference model, inference model manager 200 may host an inference model distribution manager 204. Inference model distribution manager 204 may (i) obtain an inference model, (ii) identify characteristics of data processing systems to which the inference model may be deployed, (iii) obtain portions of the inference model based on the characteristics of the data processing systems and characteristics of the inference model, (iv) obtain an execution plan based on the portions of the inference model, the characteristics of the data processing systems, and requirements of a downstream consumer (v) distribute the portions of the inference model to the data processing systems, (vi) initiate execution of the inference model using the portions of the inference model distributed to the data processing systems and/or (vii) manage the execution of the inference model based on the execution plan.

Inference model manager 200 may obtain inference model 203. Inference model manager 200 may obtain characteristics of the inference model 203. Characteristics of the inference model 203 may include, for example, a quantity of layers of a neural network inference model and a quantity of relationships between the layers of the neural network inference model. The characteristics of the inference model may include other types of characteristics based on other types of inference models without departing from embodiments disclosed herein.

Each portion of the inference model may be distributed to one data processing system throughout a distributed environment. Therefore, prior to determining the portions of the inference model, inference model distribution manager 204 may obtain system information from data processing system repository 206. System information may include a quantity of the data processing systems, a quantity of available memory of each data processing system of the data processing systems, a quantity of available storage of each data processing system of the data processing systems, a quantity of available communication bandwidth between each data processing system of the data processing systems and other data processing systems of the data processing systems, and/or a quantity of available processing resources of each data processing system of the data processing systems.

Therefore, the inference model distribution manager 204 may obtain a first portion of the inference model (e.g., inference model portion 202A) based on the system information (e.g., the available computing resources) associated with data processing system 201A and based on the data dependencies of the inference model so that inference model portion 202A reduces the necessary communications between inference model portion 202A and other portions of the inference model. Inference model distribution manager 204 may repeat the previously described process for inference model portion 202B and inference model portion 202C.

Prior to distributing the inference model portions 202A-202C, inference model distribution manager 204 may utilize the inference model portions 202A-202C to obtain execution plan 205. Execution plan 205 may include instructions for timely execution of the inference model using the portions of the inference model and based on the needs of a downstream consumer of the inferences generated by the inference model. Refer to FIG. 3B for additional details regarding obtaining an execution plan.

Inference model manager 200 may distribute inference model portion 202A to data processing system 201A, inference model portion 202B to data processing system 201B, and inference model portion 202C to data processing system 201C. While shown in FIG. 2A as distributing three portions of the inference model to three data processing systems, the inference model may be partitioned into any number of portions and distributed to any number of data processing systems throughout a distributed environment. Further, while not shown in FIG. 2A, redundant copies of the inference model portions may also be distributed to any number of data processing systems in accordance with an execution plan.

Inference model manager 102 may initiate execution of the inference model using the portions of the inference model distributed to the data processing systems to obtain an inference model result (e.g., one or more inferences). The inference model result may be usable by a downstream consumer in order to perform a task, make a control decision, and/or perform any other action set (or action).

Inference model manager 102 may manage the execution of the inference model based on the execution plan. Managing execution of the inference model may include monitoring changes to a listing of data processing systems over time and/or revising the execution plan as needed in order to obtain the inference model result in a timely manner and/or in compliance with the needs of a downstream consumer. A revised execution plan may include re-distribution of portions of the inference model and/or re-location of data processing systems in order to meet the needs of the downstream consumer. When providing its functionality, inference model manager 102 may use and/or manage agents across any number of data processing systems. These agents may collectively provide all, or a portion, of the functionality of inference model manager 102.

Turning to FIG. 2B, data processing systems 201A-201C may execute the inference model. In order to do so, data processing system 201A may obtain input data 207. Input data 207 may include any data of interest to a downstream consumer of the inferences. For example, input data 207 may include data indicating the operability and/or specifications of a product on an assembly line.

Input data 207 may be fed into inference model portion 202A in order to obtain a first partial processing result. The first partial processing result may include values and/or parameters associated with a portion of the inference model. The first partial processing result may be transmitted (e.g., via a wireless communication system) to data processing system 201B. Data processing system 201B may feed the first partial processing result into inference model portion 202B in order to obtain a second partial processing result. The second partial processing result may include values and/or parameters associated with a second portion of the inference model. The second partial processing result may be transmitted to data processing system 201C. Data processing system 201C may feed the second partial processing result into inference model portion 202C in order to obtain output data 208. Output data 208 may include inferences collectively generated by the portions of the inference model distributed across data processing systems 201A-201C.

Output data 208 may be utilized by a downstream consumer of the data in order to perform a task, make a decision, and/or perform any other action set that may rely on the inferences generated by the inference model. For example, output data 208 may include a quality control determination regarding a product manufactured in an industrial environment. The output data 208 may indicate whether the product meets the quality control standards and should be retained or does not meet the quality control standards and should be discarded. In this example, output data 208 may be used by a robotic arm to decide whether to place the product in a "retain" area or a "discard" area.

While shown in FIG. 2B as including three data processing systems, a system may include any number of data processing systems to collectively execute the inference model. Additionally, as noted above, redundant copies of the inference model hosted by multiple data processing systems may each be maintained so that termination of any portion of the inference model may not impair the continued operation of the inference model.

While described above as feeding input data 207 into data processing system 201A and obtaining output data 208 via data processing system 201C, other data processing systems may utilize input data and/or obtain output data without departing from embodiments disclosed herein. For example, data processing system 201B and/or data processing system 201C may obtain input data (not shown). In another example, data processing system 201A and/or data processing system 201B may generate output data (not shown). A downstream consumer may be configured to utilize output data obtained from data processing system 201A and/or data processing system 201B to perform a task, make a decision, and/or perform an action set.

Each of data processing systems 201A-201C may transmit an acknowledgement to inference model manager 102 (not shown) at variable time intervals as designated by an execution plan. Data processing systems 201A-201C may transmit the acknowledgement in order to maintain membership in a listing of functional data processing systems throughout the distributed environment. In the event that one of data processing systems 201A-201C may not transmit the acknowledgement at the designated time, inference model manager 102 may obtain a revised execution plan and/or re-distribute the inference model portion hosted by the non-functional data processing system to another available data processing system.

By executing the inference model across multiple data processing systems, computing resource expenditure throughout the distributed environment may be reduced. In addition, by managing execution of the inference model, the functionality of the data processing systems may be adapted over time to remain in compliance with the needs of a downstream consumer.

In an embodiment, inference model distribution manager 204 is implemented using a processor adapted to execute computing code stored on a persistent storage that when executed by the processor performs the functionality of inference model distribution manager 204 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to execute an inference model throughout a distributed environment. FIGS. 3A-3D illustrate methods that may be performed by the components of FIG. 1. In the diagrams discussed below and shown in FIGS. 3A-3D, any of the operations may be repeated, performed in different orders, and/or performed in parallel with or in a partially overlapping in time manner with other operations.

Figure 3A:
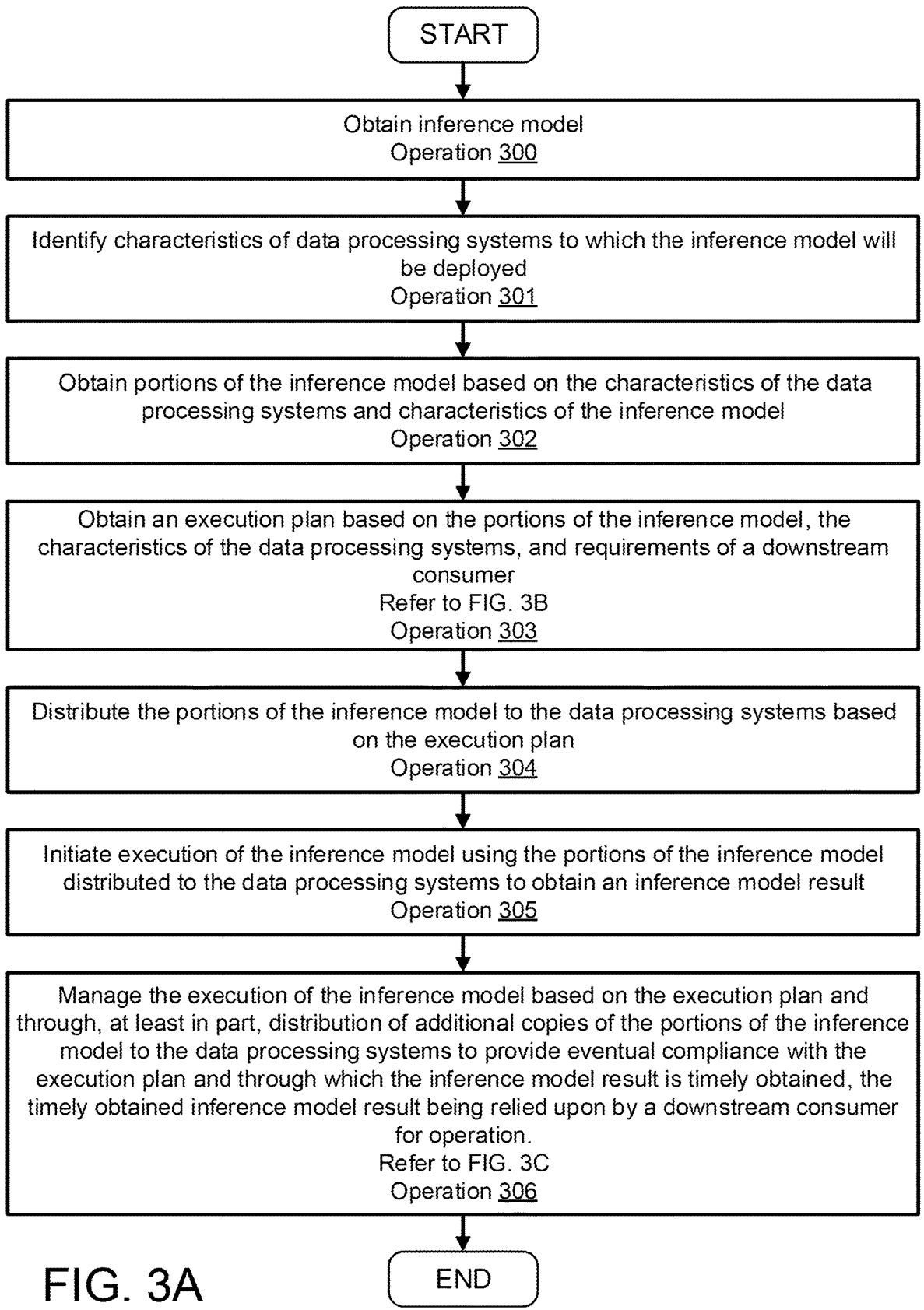
FIG. 3A shows a flow diagram illustrating a method of executing an inference model across multiple data processing systems throughout a distributed environment in accordance with an embodiment.
Figure 3B:
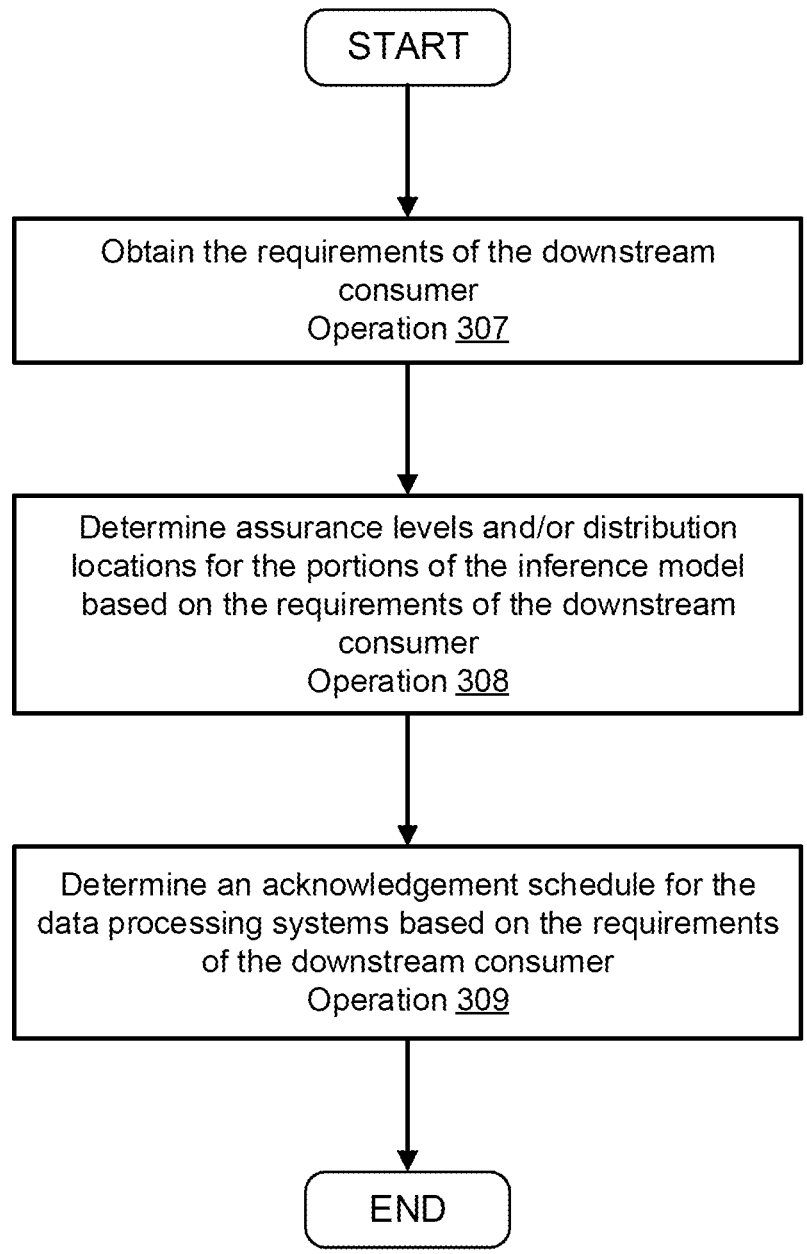
FIG. 3B shows a flow diagram illustrating a method of obtaining an execution plan in accordance with an embodiment.
Figure 3C:
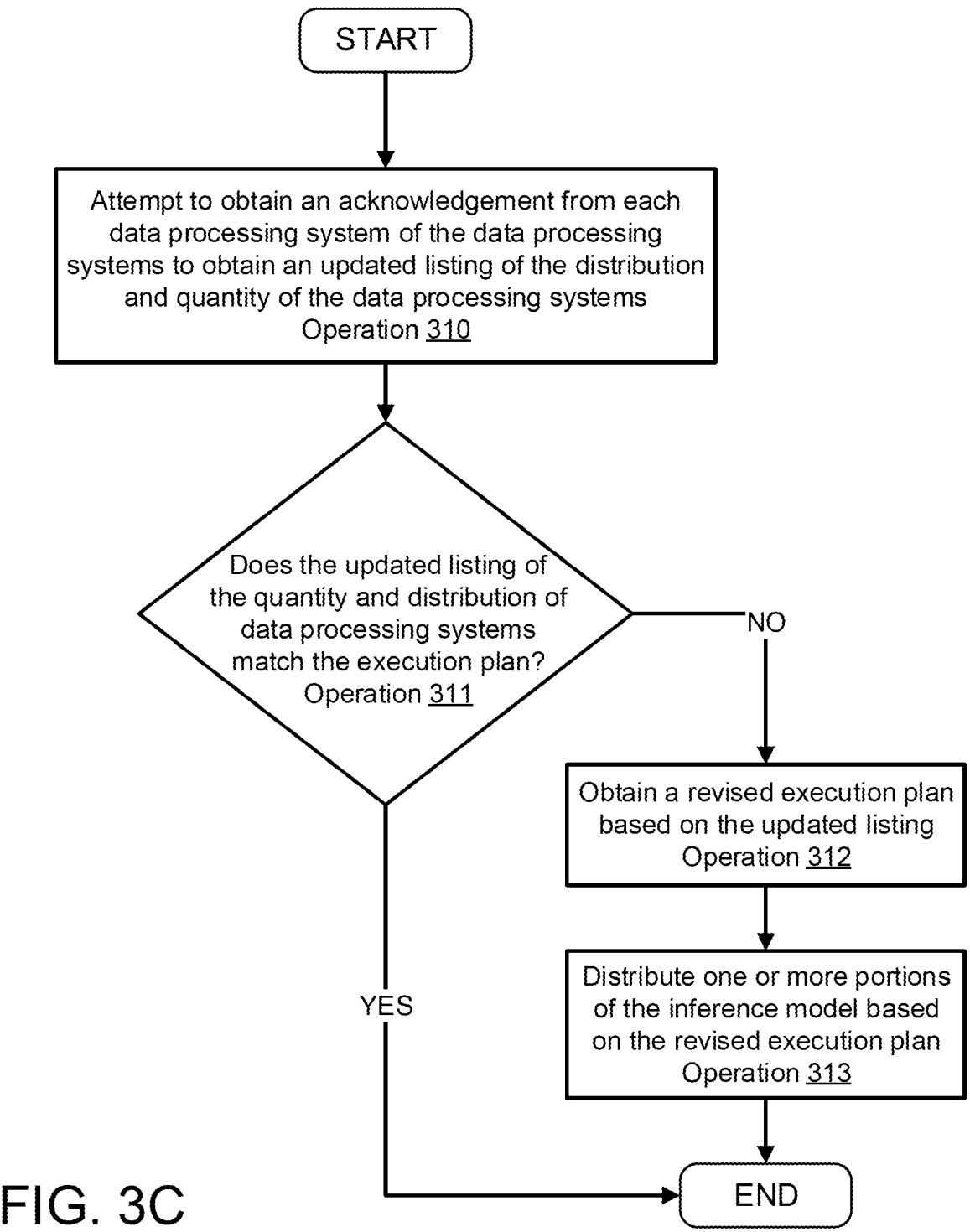
FIG. 3C shows a flow diagram illustrating a method of managing execution of an inference model in accordance with an embodiment.

Turning to FIG. 3A, a flow diagram illustrating a method of executing an inference model across multiple data processing systems throughout a distributed environment is shown.

At operation 300, an inference model is obtained. The inference model may be implemented with, for example, a neural network inference model. The inference model may generate inferences that may be usable to downstream consumers.

In an embodiment, the inference model may be obtained by the inference model manager 102 using a training data set. The training data set may be fed into a neural network inference model (and/or any other type of inference generation model) to obtain the inference model. The inference model may also be obtained from another entity through a communication system. For example, an inference model may be obtained by another entity through training a neural network inference model and providing the trained neural network inference model to the inference model manager 102.

At operation 301, characteristics of data processing systems to which the inference model may be deployed are identified. Characteristics of the data processing systems may include a quantity of the data processing systems, a quantity of available storage of each data processing system of the data processing systems, a quantity of available memory of each data processing system of the data processing systems, a quantity of available communication bandwidth between each data processing system of the data processing system and other data processing systems of the data processing systems, and/or a quantity of available processing resources of each data processing system of the data processing systems. The characteristics of the data processing systems may be utilized by inference model manager 102 in order to obtain portions of an inference model as described below. The characteristics of the data processing systems may be provided to the inference model manager 102 from the data processing systems, and/or from any other entity throughout the distributed environment.

At operation 302, portions of the inference model are obtained based on the characteristics of the data processing systems and characteristics of the inference model. In order to obtain the portions of the inference model, inference model manager 102 may, for example, represent the neural network inference model as a bipartite graph, the bipartite graph indicating data dependencies between nodes in the neural network inference model. Refer to FIG. 1 for additional details regarding obtaining portions of an inference model.

In an embodiment, portions of the inference model may be obtained by another entity throughout the distributed environment via any method. The other entity may transmit the portions of the inference model (and/or instructions for obtaining the portions of the inference model) to the inference model manager 102.

At operation 303, an execution plan is obtained based on the portions of the inference model, the characteristics of the data processing systems, and requirements of a downstream consumer. The execution plan may include: (i) instructions for obtaining portions of the inference model, (ii) instructions for distribution of the inference model, (iii) instructions for execution of the inference model, and/or other instructions. The execution plan may be obtained in order to facilitate timely execution of the inference model in accordance with the needs of a downstream consumer of the inferences generated by the inference model. The execution plan may be generated by the inference model manager 102 and/or obtained from another entity throughout the distributed environment. Refer to FIG. 3B for additional details regarding obtaining an execution plan.

At operation 304, the portions of the inference model are distributed to the data processing systems based on the execution plan. The portions of the inference model may be distributed to data processing systems in a manner that reduces communications between data processing systems during execution of the inference model and utilizes the available computing resources of each data processing system. One portion of the portions of the inference model may be distributed to each data processing system of the data processing systems.

At operation 305, execution of the inference model is initiated using the portions of the inference model distributed to the data processing systems to obtain an inference model result. The inference model may be executed in accordance with the execution plan. The inference model manager 102 may execute the inference model by sending instructions and/or commands to the data processing systems 100 to initiate the execution of the inference model.

In an embodiment, the inference model may be executed using input data. The input data may be obtained by the inference model manager 102, any of data processing systems 100 and/or another entity. Inference model manager 102 may obtain the input data and transmit the input data to a first data processing system of the data processing systems 100 along with instructions for timely executing the inference model based on the input data. The instructions for timely execution of the inference model may be based on the needs of a downstream consumer with respect to the inferences generated by the inference model.

At operation 306, the execution of the inference model is managed based on the execution plan and through, at least in part, distribution of additional copies of the portions of the inference model to the data processing systems to provide eventual compliance with the execution plan and through which the inference model result is timely obtained. The timely obtained inference model result may be relied upon by a downstream consumer for operation. Refer to FIG. 3C for additional details regarding managing execution of an inference model.

In an embodiment, inference model manager 102 may manage the execution of the inference model. In another embodiment, another entity throughout the distributed environment may manage the execution of the inference model.

The method may end following operation 306.

Turning to FIG. 3B, a flow diagram illustrating a method of obtaining an execution plan in accordance with an embodiment is shown. The operations in FIG. 3B may be an expansion of operation 303 in FIG. 3A.

At operation 307, requirements of the downstream consumer are obtained. The requirements of the downstream consumer may include assurance levels for each portion of the inference model, execution locations for each portion of the inference model, an acknowledgment schedule for the data processing system, a compliance standard for deviation of the portions of the inference model from the execution plan, and/or other requirements. Requirements of the downstream consumer may be obtained by inference model manager 102 directly from the downstream consumer. In another embodiment, another entity (e.g., a downstream consumer data aggregator) may aggregate data related to the needs of one or more downstream consumers throughout a distributed environment and may transmit this information to the inference model manager 102 as needed.

At operation 308, assurance levels and/or distribution locations are determined for the portions of the inference model based on the requirements of the downstream consumer. Assurance levels may indicate a quantity of instances of a corresponding portion of the inference model that are to be hosted by the data processing systems. Distribution locations (e.g., execution locations) may be selected in order to reduce geographic clustering of redundant instances of the portions of the inference model. The assurance levels and/or distribution locations may be obtained in operation 307 as part of the needs of the downstream consumer.

At operation 309, an acknowledgement schedule is determined for the data processing systems based on the requirements of the downstream consumer. The acknowledgment schedule may instruct data processing systems to transmit an acknowledgement of functionality to inference model manager 102 at various time intervals. For example, the operation of a downstream consumer may be highly sensitive to variations in transmissions of the inferences generated by the inference model (e.g., latencies in receiving inferences due to communication pathway bottlenecks). Therefore, the downstream consumer may require frequent updates to the execution plan. In order to do so, the inference model manager 102 may determine an acknowledgement schedule of five acknowledgements per hour. In another example, the operation of a second downstream consumer may not be highly sensitive to variations in transmissions of the inferences generated by the inference model (e.g., latencies in receiving inferences due to communication pathway bottlenecks). Therefore, the downstream consumer may not require frequent updates to the execution plan and inference model manager may determine an acknowledgment schedule of one acknowledgement per day.

In an embodiment, the acknowledgement schedule may be determined by the inference model manager 102 as described above. In another embodiment, the acknowledgment schedule may be determined by the downstream consumer (and/or other entity) and transmitted to inference model manager 102 for implementation.

The method may end following operation 309.

Turning to FIG. 3C, a flow diagram illustrating a method of managing execution of an inference model in accordance with an embodiment is shown.

At operation 310, an acknowledgment is attempted to be obtained from each data processing system of the data processing systems to obtain an updated listing of the distribution and quantity of the data processing systems. The attempt to obtain an acknowledgement may occur continuously or at various time intervals. The time intervals may be specified by the execution plan in order to meet the needs of a downstream consumer. The acknowledgment may include an indication of the functionality and/or the location of the data processing system, which may be used to obtain the updated listing.

In an embodiment, inference model manager 102 may attempt to obtain the acknowledgment from each data processing system of the data processing systems. In another embodiment, another entity (e.g., an acknowledgement manager) may attempt to obtain acknowledgements from the data processing systems, obtain an updated listing, and provide the updated listing to the inference model manager 102.

At operation 311, it is determined whether the updated listing of the quantity and distribution of data processing systems matches the execution plan. This determination may be made by the inference model manager 102 and/or another entity throughout the distributed environment. If the updated listing of the quantity and distribution of data processing systems matches the execution plan, the method may end following operation 311. If the updated listing of the quantity and distribution of data processing systems does not match the execution plan, the method may proceed to operation 312.

At operation 312, a revised execution plan is obtained based on the updated listing. The revised execution plan may include instructions for re-assignment and/or re-location of one or more data processing systems in order to restore compliance with the needs of a downstream consumer. For example, the downstream consumer may stipulate that a first portion of the inference model must be hosted separately by at least two data processing systems in order to ensure functionality of the inference model. In this example, one data processing system of the at least two data processing systems hosting the first portion may lose functionality. Therefore, the updated listing may reflect that the inference model may no longer comply with the needs of the downstream consumer. In order to return to compliance, inference model manager may distribute the first portion of the inference model to a third data processing system (e.g., a data processing system not hosting the first portion of the inference model). The third data processing system may previously host another portion of the inference model that may not be required to meet the needs of the downstream consumer. In another embodiment, the third data processing system may not be previously assigned to any portion of the inference model.

At operation 313, one or more portions of the inference model are distributed based on the revised execution plan. Continuing with the above example, the first portion may be distributed to the third data processing system along with instructions for the third data processing system to host and execute the first portion of the inference model. The instructions may direct the third data processing system to discard the previously hosted portion of the inference model (if relevant), to begin operation of the first portion of the inference model, and/or to move to a new location indicated by the revised execution plan.

In an embodiment, the inference model manager 102 may distribute the one or more portions of the inference model. In another embodiment, the one or more portions may be obtained from another entity (e.g., another inference model manager) throughout the same and/or a similar distributed environment.

The method may end following operation 313

Figure 3D:
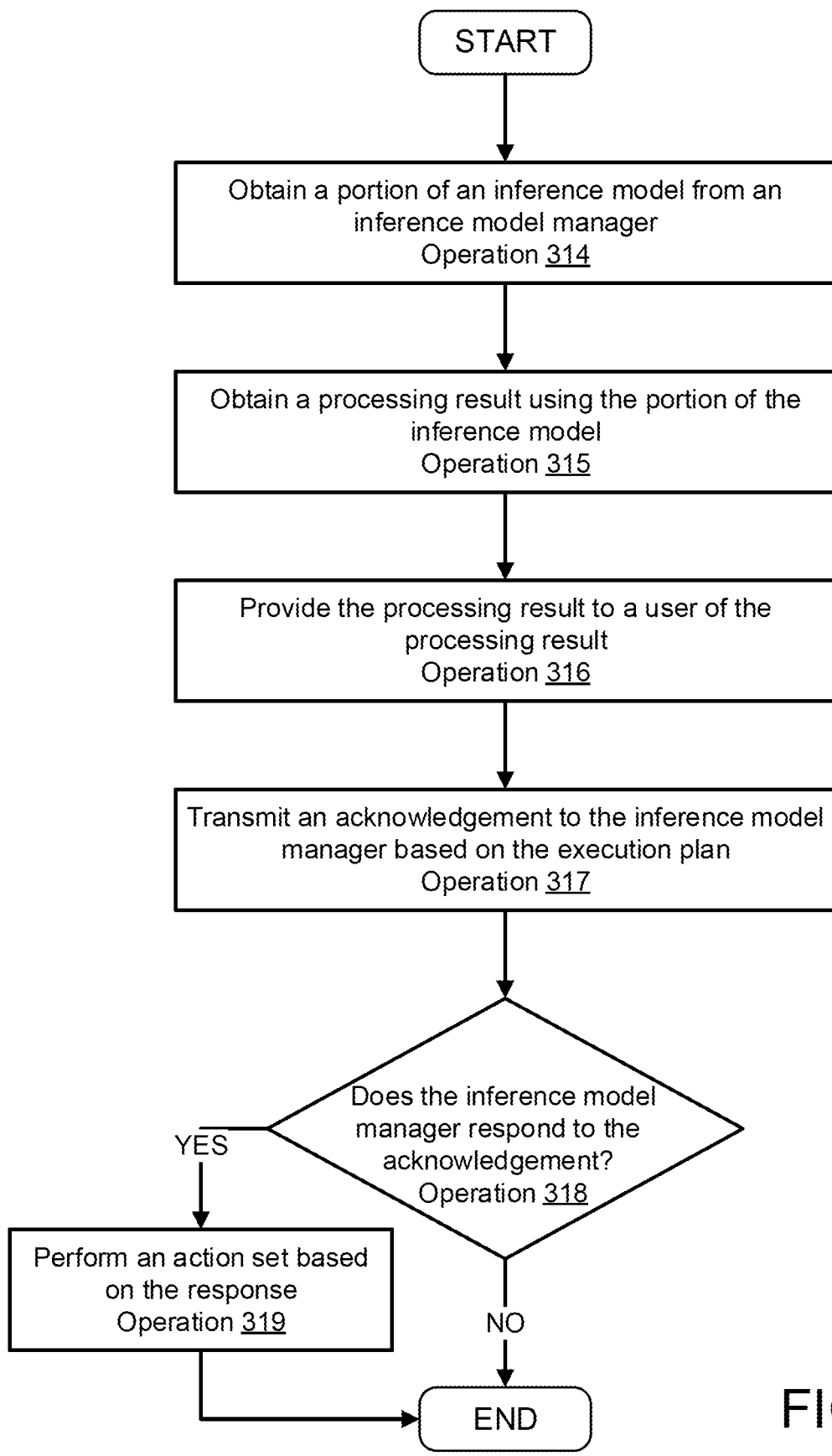
FIG. 3D shows a flow diagram illustrating a method of obtaining a processing result using a portion of an inference model in accordance with an embodiment.

Turning to FIG. 3D, a flow diagram illustrating a method of obtaining a processing result using a portion of an inference model in accordance with an embodiment is shown.

At operation 314, a portion of an inference model is obtained from an inference model manager. The portion of the inference model may utilize the computing resources available to a data processing system (e.g., data processing system 100A). For example, data processing system 100A may be a temperature sensor in an industrial environment. The temperature sensor may have access to 100 units of available computing resources. Therefore, the portion of the inference model obtained by the temperature sensor may require 90 units of computing resources (and/or any number of computing resources below the available 100 units).

In an embodiment, a data processing system (e.g., data processing system 100A) may obtain the portion of the inference model from inference model manager 102. Alternatively, the data processing system may obtain the portion of the inference model from another entity (e.g., another inference model manager, another data processing system, etc.) throughout the distributed environment. The data processing system may also obtain instructions regarding the timely execution of the inference model (e.g., an execution plan).

At operation 315, a processing result is obtained using the portion of the inference model. Data processing system 100A may obtain a processing result by feeding input data into the portion of the inference model hosted by the data processing system 100A. The input data may include live (e.g., unprocessed) data and/or may include a partial processing result obtained as the output of a second portion of the inference model hosted by a second data processing system (e.g., data processing system 100B).

In an embodiment, the processing result may include a set of values, parameters, and/or other data usable by a third data processing system (e.g., data processing system 100C) as input data for a third portion of the inference model. Alternatively, the processing result may include output data usable by a downstream consumer of the inferences generated by the inference model.

At operation 316, the processing result is provided to a user of the processing result. As previously mentioned, the user of the processing result may be a downstream consumer, another data processing system, and/or another entity.

At operation 317, an acknowledgement is transmitted based on the execution plan. The acknowledgement may include an indication of functionality and/or a location of the data processing system. The acknowledgement may be transmitted at various time intervals (e.g., once per hour, once per day, in response to an event, etc.) to the inference model manager and/or any other entity responsible for updating a listing of the quantity and location of data processing systems throughout the distributed environment.

At operation 318, it is determined whether the inference model manager (and/or other entity) responds to the acknowledgement. In the event that the inference model manager (and/or other entity) responds to the acknowledgement, the method may proceed to operation 319. In the event that the inference model manager (and/or other entity) does not respond to the acknowledgement, the method may end following operation 318.

At operation 319, an action set is performed based on the response. The response may include a new portion of the inference model and/or instructions for implementing a new portion of the inference model. The response may also include a new distribution plan (e.g., a new geographic location for the data processing system). Therefore, the action set may include discarding a previously hosted portion of the inference model, executing a new portion of the inference model, and/or moving to a new location.

The method may end following operation 319.

To further clarify embodiments disclosed herein, an example implementation in accordance with an embodiment is shown in FIGS. 4A-4J. These figures show diagrams illustrating an inference model execution and management process to support an environmental conservation effort in accordance with an embodiment. FIGS. 4A-4J may show examples of processes for obtaining inferences using an inference model across multiple data processing systems to drive the environmental conservation effort in accordance with an embodiment. While described with respect to environmental conservation efforts, it will be understood that embodiments disclosed herein are broadly application to different use cases as well as different types of data processing systems than those described below.

Figure 4A:
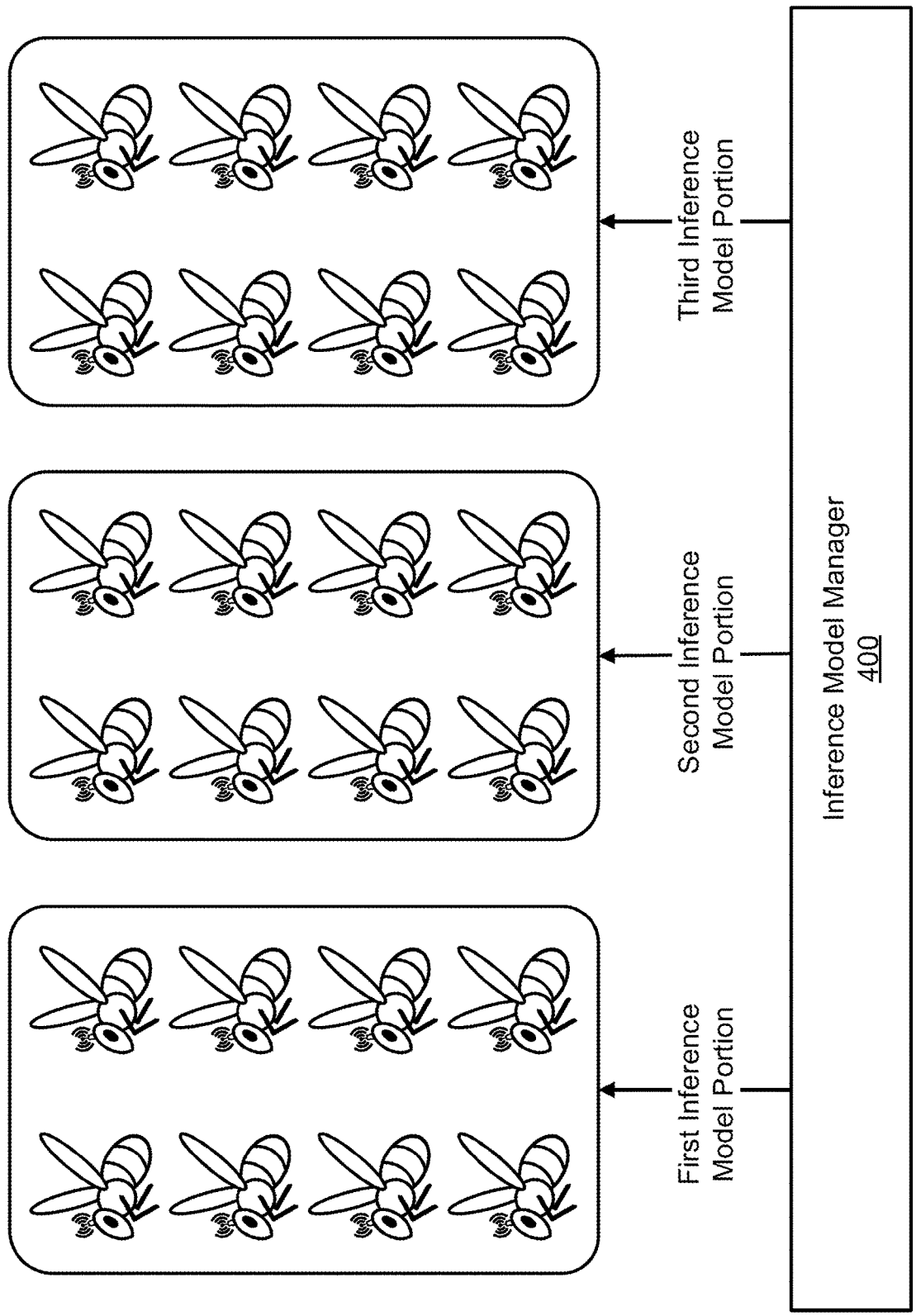
FIGS. 4A-4J show diagrams illustrating a method of executing an inference model across multiple data processing systems over time in accordance with an embodiment.

Turning to FIG. 4A, consider a scenario in which a swarm of artificial bees (e.g., data processing systems having limited computing resources) may be configured to pollinate plants along a pollination route. The swarm of artificial bees may collect data from the environment (e.g., types of plant life, density of plant life, etc.) and generate inferences in order to make decisions regarding which plants to pollinate and/or how to adjust the pollination route. In order to generate the inferences, an inference model may be partitioned into portions and each portion may be distributed to a unique artificial bee in the swarm of artificial bees. However, the artificial bees may encounter adverse environmental conditions (e.g., weather patterns, wildlife, etc.) that may lead to the termination of one or more artificial bees. In order to maintain functionality of the inference model in the event of the termination of one or more artificial bees, the artificial bees may operate in compliance with an execution plan as described below.

In order to distribute portions of an inference model, inference model manager 400 may obtain an execution plan. The execution plan may include instructions for distribution, execution, and management of inference model in order to facilitate timely execution of the inference model with respect to the needs of a downstream consumer (in this example, the artificial bees themselves). The instructions for distribution may include a quantity of copies of each portion of the inference model in order to maintain redundancy and/or execution locations (e.g., geographic locations) for the artificial bees.

For example, the execution plan may require operation of at least two copies of each portion of the inference model in order to provide redundancy and ensure accuracy of inferences generated by each portion of the inference model. In addition, the execution plan may divide the pollination route into three segments (e.g., different geographic locations) and deploy a group of artificial bees to each segment of the pollination route. Each group of the artificial bees may include two copies of each portion of the inference model (in order to comply with the execution plan), additional copies of any portion of the inference model, and possibly at least one unassigned artificial bee (an artificial bee that may not host a portion of the inference model). By doing so, additional copies of portions of the inference model may be available in the event of a location-specific mass failure event of the artificial bees.

As shown in FIG. 4A, inference model manager 400 may distribute eight copies of the first portion of the inference model to eight artificial bees, eight copies of the second portion of the inference model to eight artificial bees, and eight copies of the third portion of the inference model to eight artificial bees. In this example, additional copies are shown (e.g., beyond what is required by the execution plan) in order to provide for dynamic management of the inference model. However, additional or fewer copies may be distributed to any number of artificial bees without departing from embodiments disclosed herein.

The execution plan may also instruct each artificial bee to transmit an acknowledgment of functionality to the inference model manager 400 once per hour. By doing so, inference model manager 400 may determine whether the swarm of artificial bees remains in compliance with the execution plan.

Figure 4B:
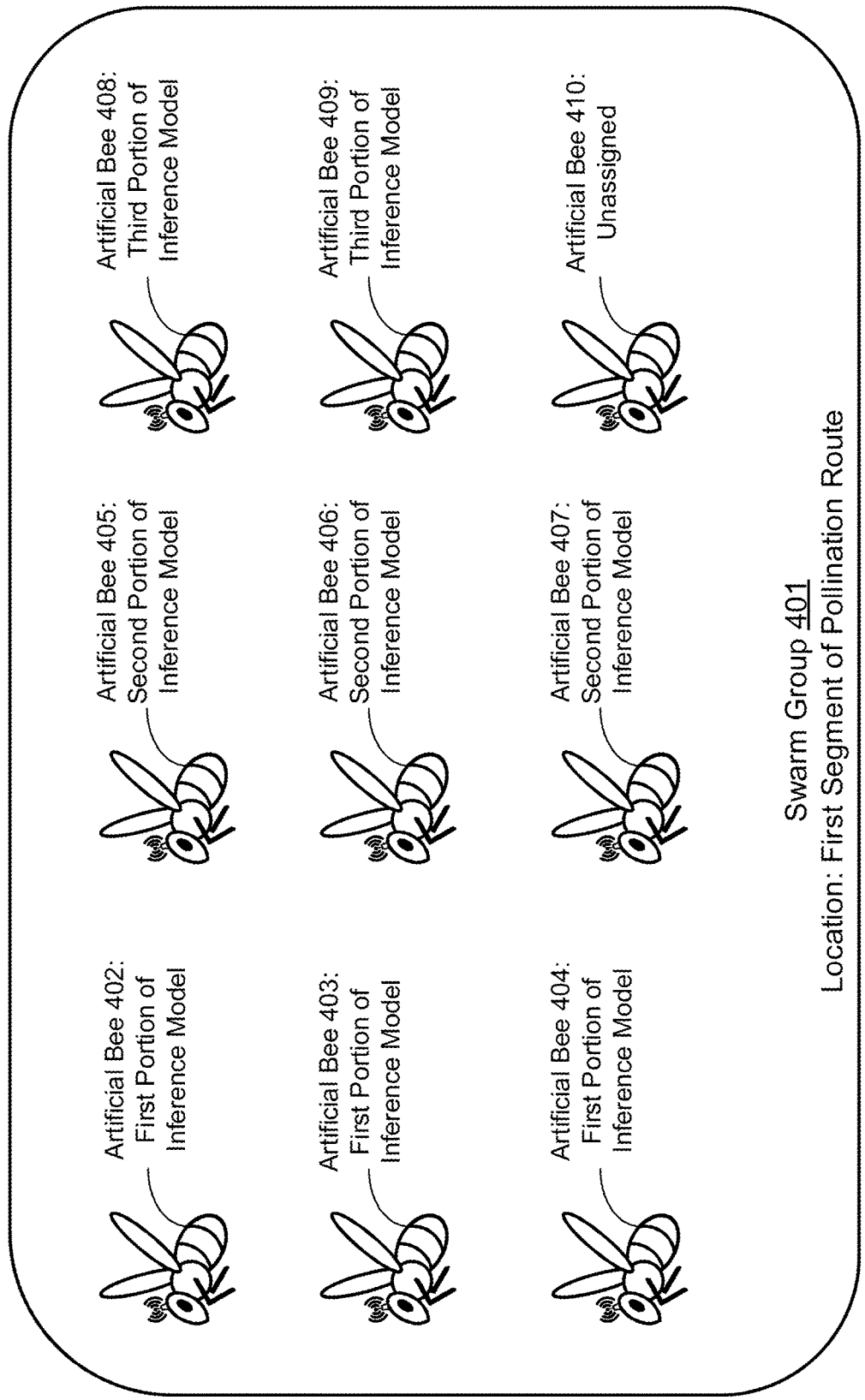

Turning to FIG. 4B, nine artificial bees may be assigned to swarm group 401 and swarm group 401 may be assigned to a first segment of the pollination route. Three artificial bees (e.g., artificial bees 402, 403, and 404) may host the first portion of the inference model. Similarly, three artificial bees (e.g., artificial bees 405, 406, and 407) may host the second portion of the inference model and two artificial bees (e.g., artificial bees 408 and 409) may host the third portion of the inference model. Artificial bee 410 may not host any portion of the inference model.

Figure 4C:
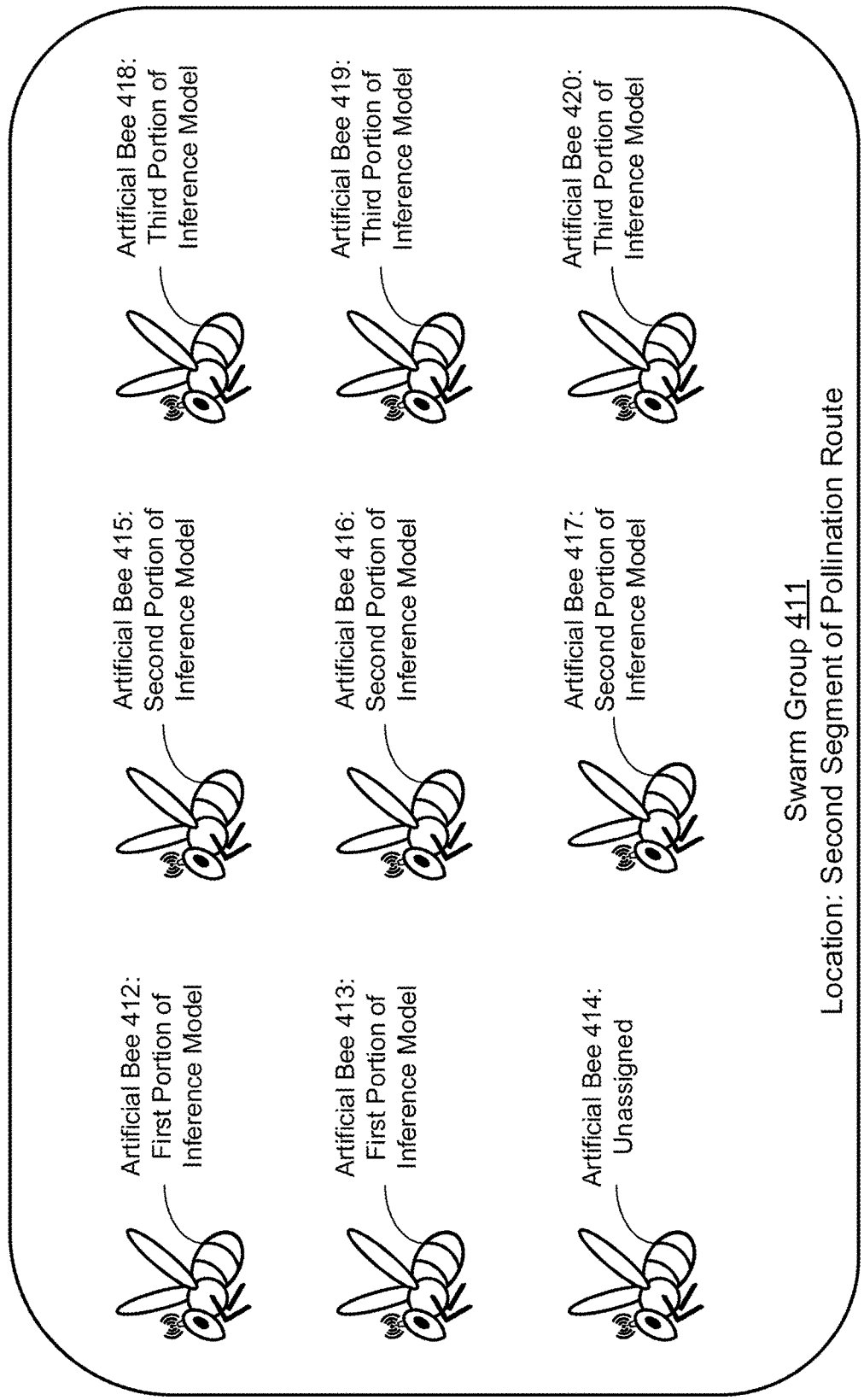

Turning to FIG. 4C, nine artificial bees may be assigned to swarm group 411 and swarm group 411 may be assigned to a second segment of the pollination route. The second segment of the pollination route may be assigned to a different geographic location than the first segment of the pollination route. By doing so, redundant copies of the inference model may be protected in the event of a location-specific mass failure event of the artificial bees in one segment of the pollination route.

As shown in FIG. 4C, two artificial bees (e.g., artificial bees 412 and 413) may host the first portion of the inference model. Similarly, three artificial bees (e.g., artificial bees 415, 416, and 417) may host the second portion of the inference model and three artificial bees (e.g., artificial bees 418, 419, and 420) may host the third portion of the inference model. Artificial bee 414 may not host any portion of the inference model.

Figure 4D:
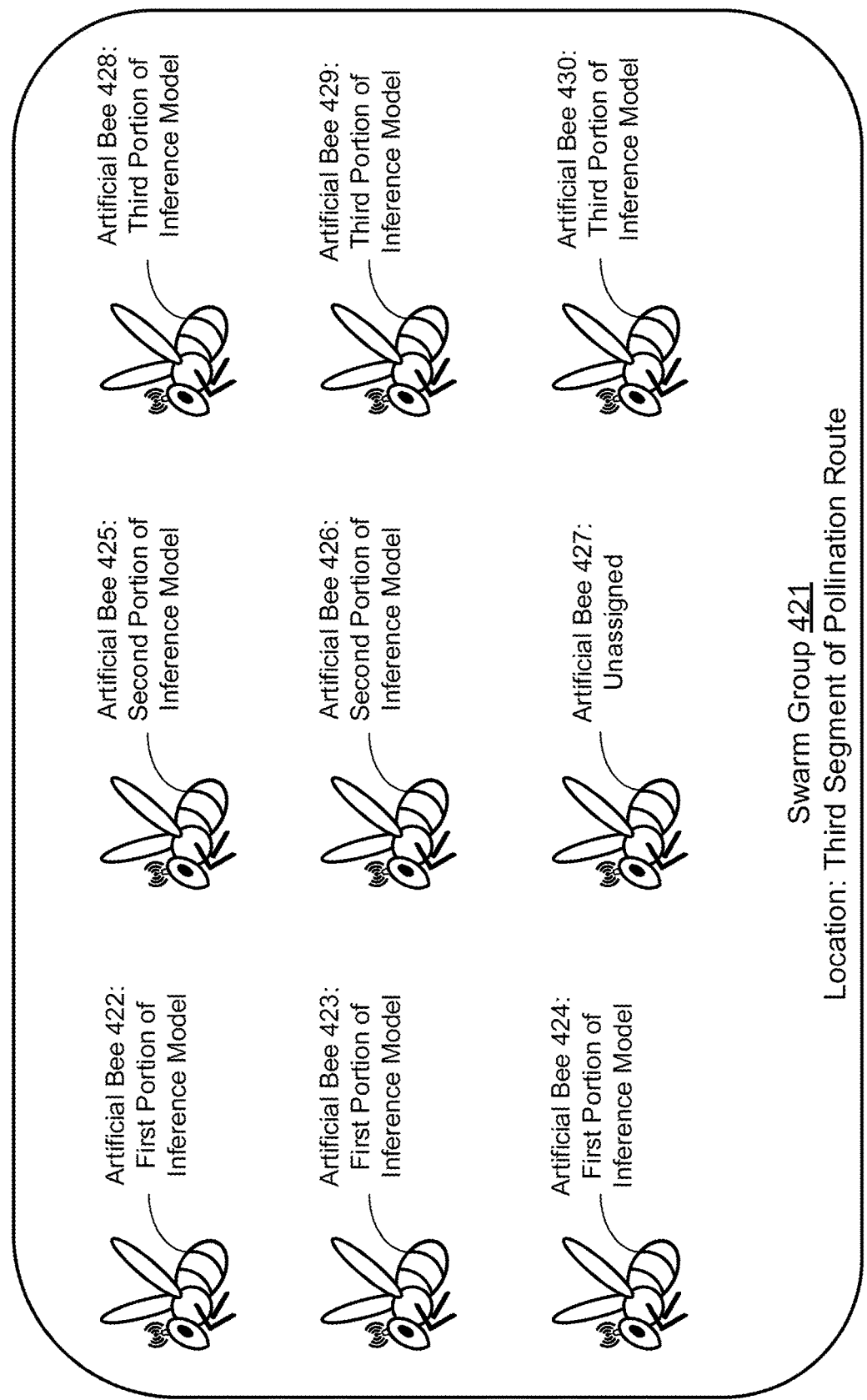

Turning to FIG. 4D, nine artificial bees may be assigned to swarm group 421 and swarm group 421 may be assigned to a third segment of the pollination route. The third segment of the pollination route may be assigned to a different geographic location than the first and second segments of the pollination route.

As shown in FIG. 4D, three artificial bees (e.g., artificial bees 422, 423 and 424) may host the first portion of the inference model. Similarly, two artificial bees (e.g., artificial bees 425, and 426) may host the second portion of the inference model and three artificial bees (e.g., artificial bees 428, 429, and 430) may host the third portion of the inference model. Artificial bee 427 may not host any portion of the inference model.

Figure 4E:
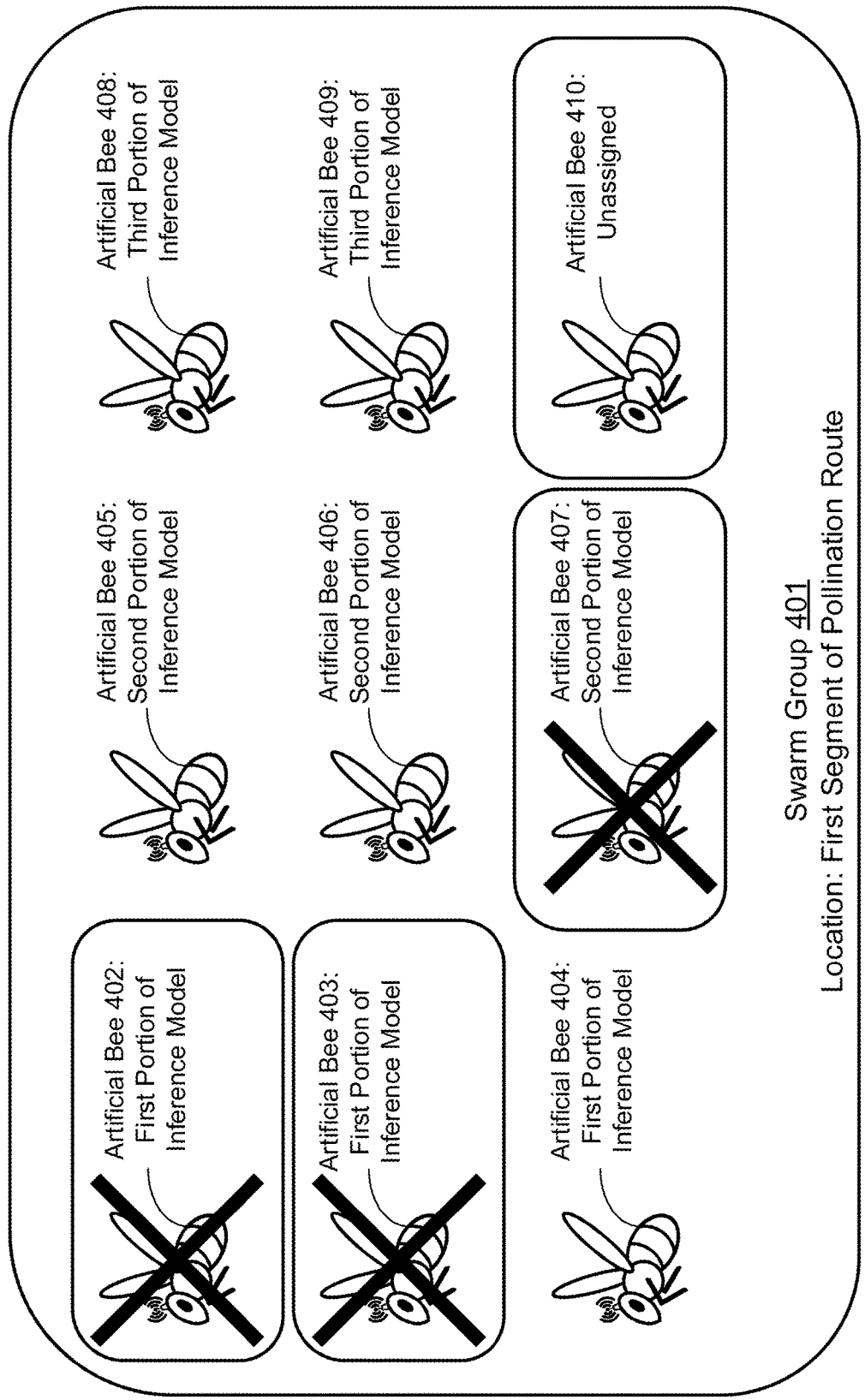

Turning to FIG. 4E, swarm group 401 may encounter birds (e.g., purple martins) along the first segment of the pollination route. The purple martins may attempt to eat artificial bees 402, 403 and 407. By doing so, the portions of the inference model hosted by artificial bees 402, 403, and 407 may lose functionality. In this example, artificial bee 407 may host a third copy of the second portion of the inference model and, therefore, may not be required in order to comply with the execution plan. However, artificial bees 402 and 403 may both host copies of the first portion of the inference model and only one functional copy of the first portion of the inference model may remain.

The remaining artificial bees in swarm group 401 may transmit an acknowledgment of functionality to inference model manager 400. Inference model manager may determine that the swarm group 401 may be out of compliance with the execution plan based on an updated listing of the artificial bees in swarm group 401 (e.g., only one copy of the first portion of the inference model remaining). In order to return swarm group 401 to compliance with the execution plan, inference model manager 400 may distribute the first portion of the inference model to artificial bee 410 (currently unassigned).

Figure 4F:
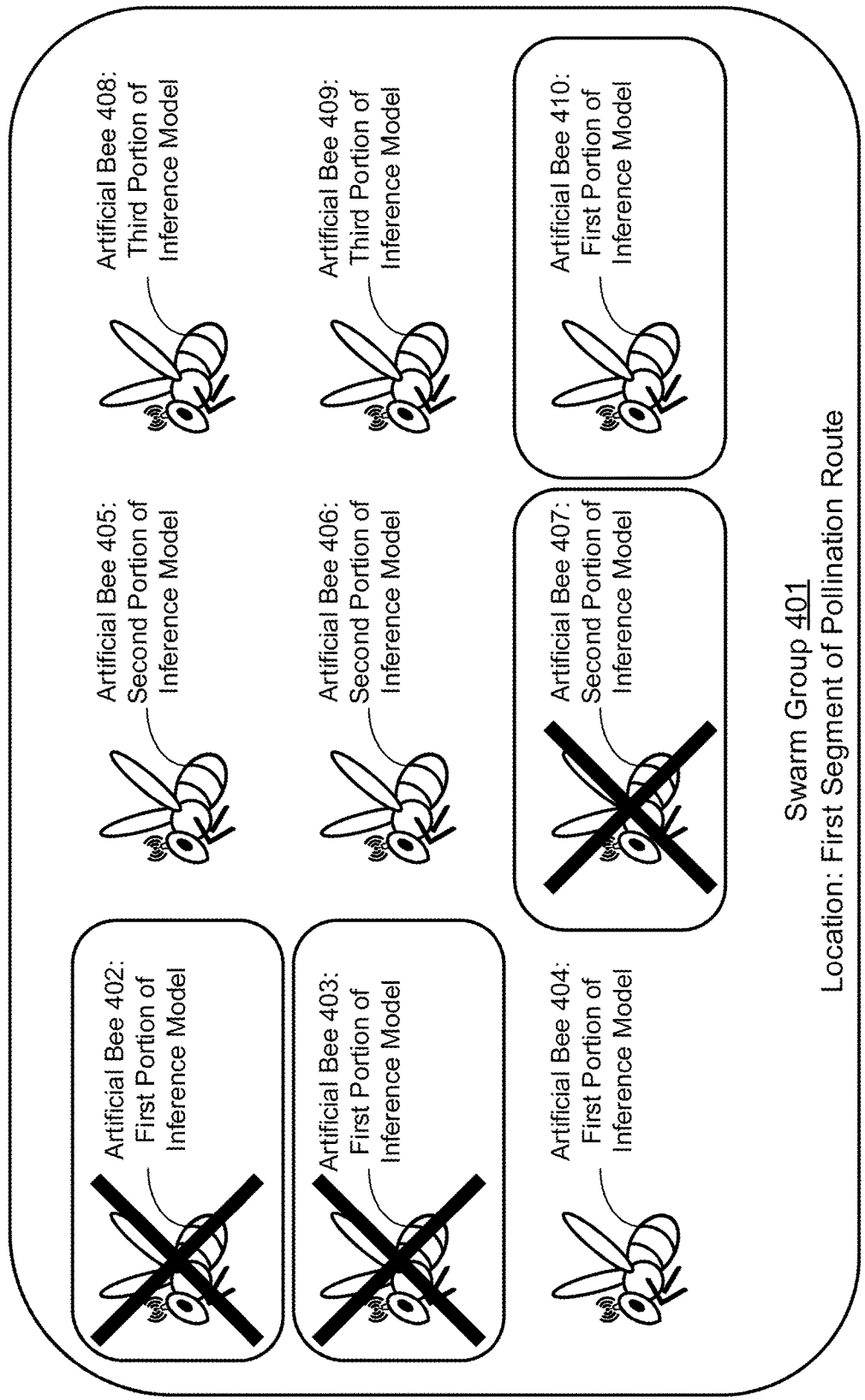

Turning to FIG. 4F, an updated assignment of the artificial bees in swarm group 401 is shown. By assigning the first portion of the inference model to artificial bee 410, swarm group 410 may continue to operate in compliance with the execution plan without deploying new artificial bees or recalling swarm group 401 from their pollination route.

Figure 4G:
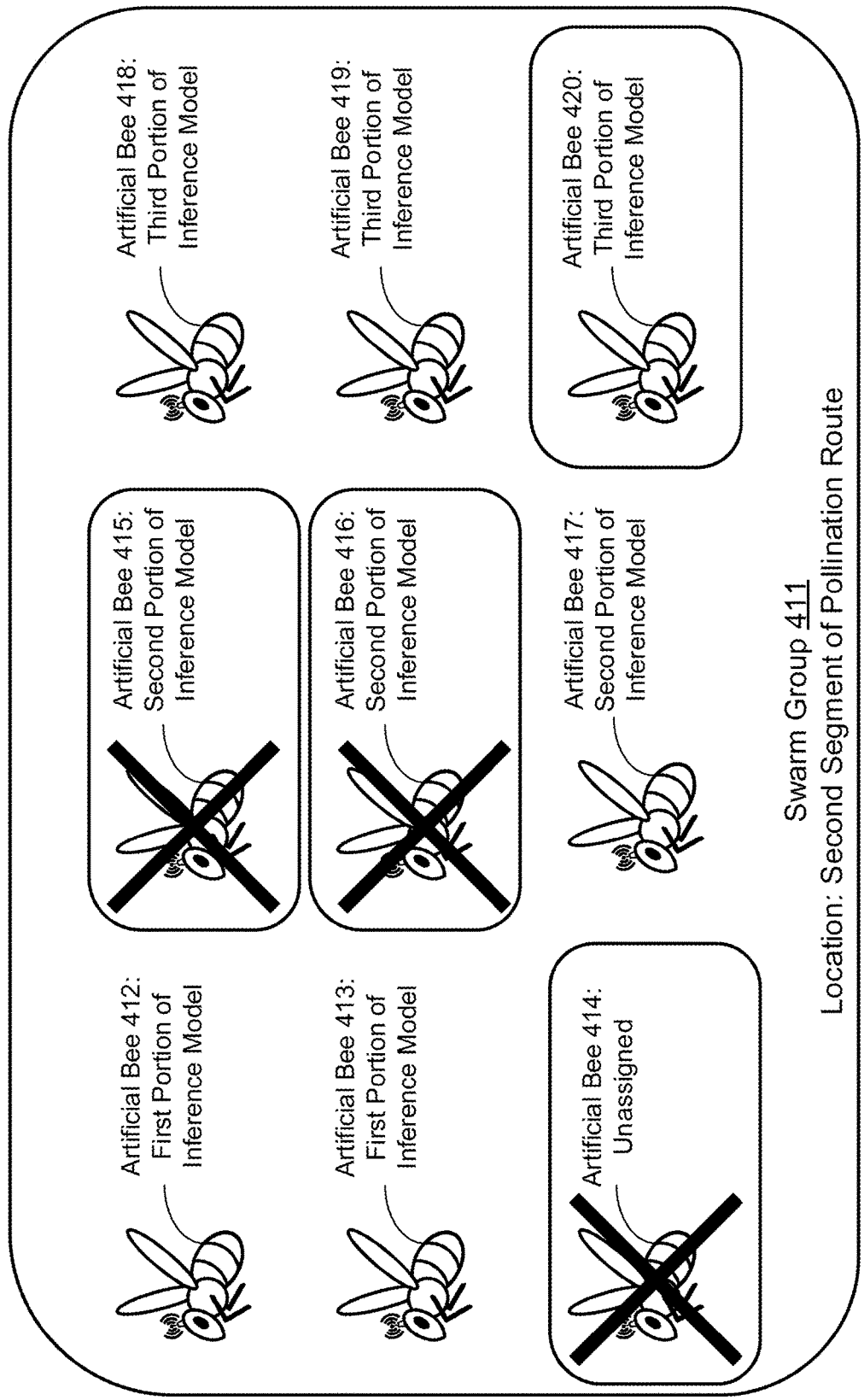

Turning to FIG. 4G, swarm group 411 may fly through some overgrown plant life. The artificial bees of swarm group 411 may get caught in the thorns of an overgrown bush and three of the artificial bees (e.g., artificial bees 414, 415, and 416) may lose their connection with the rest of swarm group 411. By doing so, the portions of the inference model hosted by artificial bees 414, 415, and 416 may lose functionality. In this example, artificial bee 414 may not host a copy of any portion of the inference model and, therefore, may not be required in order to comply with the execution plan. However, artificial bees 415 and 416 may both host copies of the second portion of the inference model and only one functional copy of the second portion of the inference model may remain.

The remaining artificial bees in swarm group 411 may transmit an acknowledgment of functionality to inference model manager 400. Inference model manager may determine that the swarm group 411 may be out of compliance with the execution plan based on an updated listing of the artificial bees in swarm group 411 (e.g., only one copy of the second portion of the inference model remains). In order to return swarm group 411 to compliance with the execution plan, inference model manager 400 may determine which artificial bees in swarm group 411 may not be essential according to the execution plan. Artificial bee 420 may host a third copy of the third portion of the inference model. As only two copies of each portion may be required by the execution plan, inference model manager 400 may distribute the second portion of the inference model to artificial bee 420 along with instructions for artificial bee 420 to discard the third portion of the inference model.

Figure 4H:
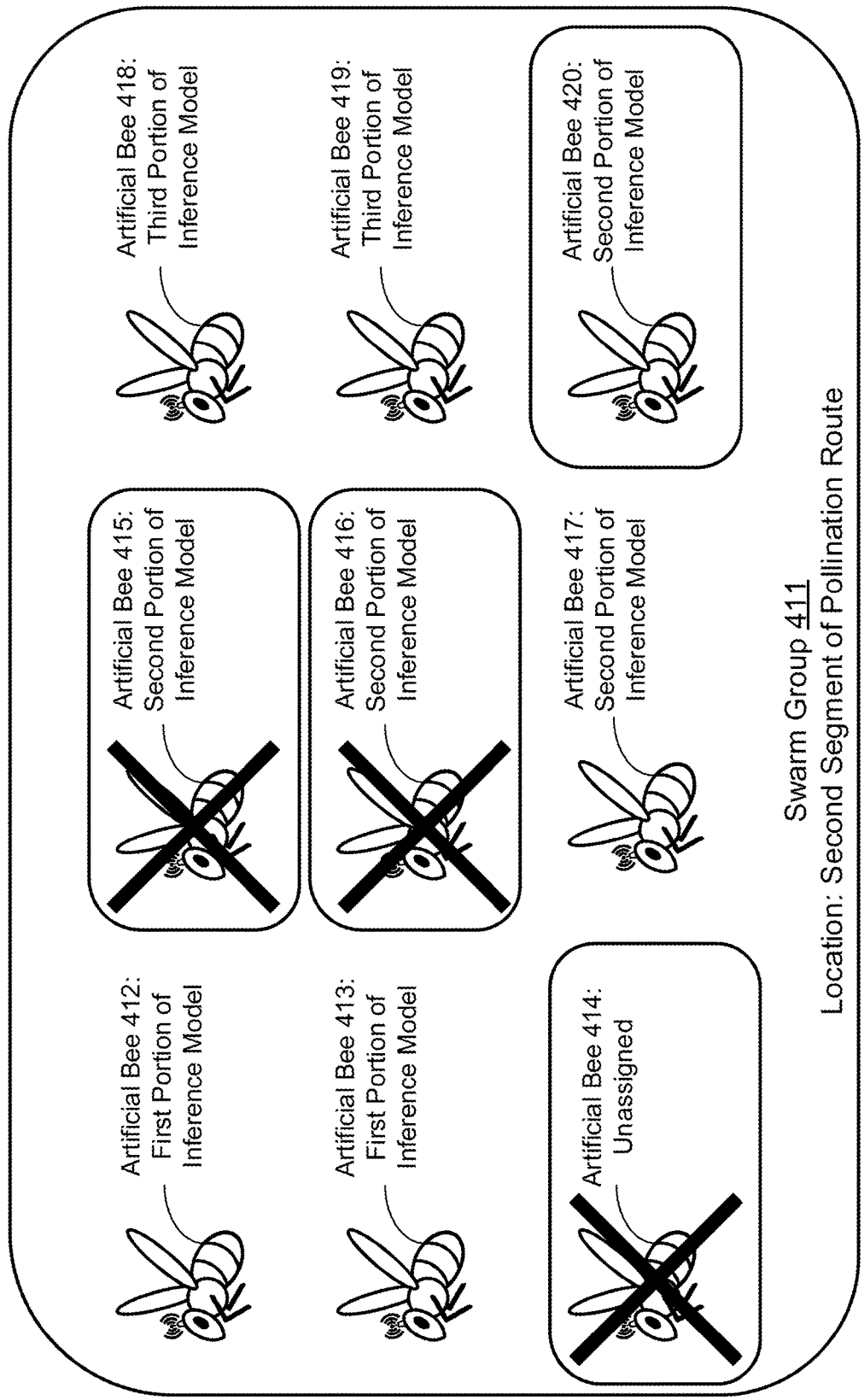

Turning to FIG. 4H, an updated assignment of the artificial bees in swarm group 411 is shown. By assigning the second portion of the inference model to artificial bee 420, swarm group 411 may continue to operate in compliance with the execution plan without deploying new artificial bees or recalling swarm group 401 from their pollination route.

Figure 4I:
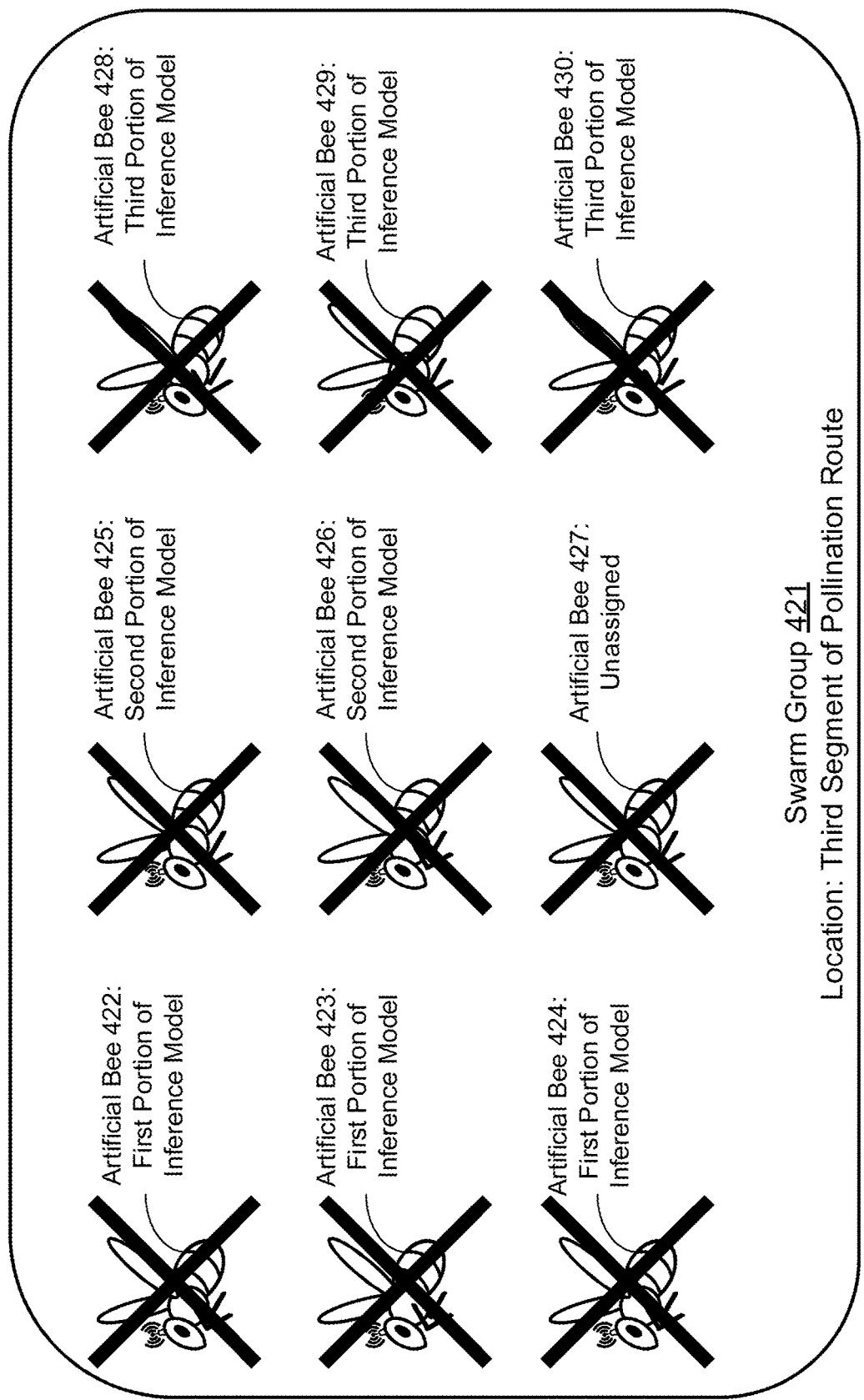

Turning to FIG. 4I, swarm group 421 may encounter a thunderstorm with strong winds. The artificial bees of swarm group 421 may get caught in the storm and a mass failure event may cause all of the artificial bees in swarm group 421 to lose their functionality. Therefore, the inference model may no longer operate in the third segment of the pollination route.

No acknowledgements of functionality may be transmitted to inference model manager 400. Therefore, inference model manager 400 may determine that the swarm group 421 has experienced a mass failure event and may be out of compliance with the execution plan. In order to resume functionality of the inference model in the third segment of the pollination route, inference model manager 400 may re-locate redundant artificial bees (e.g., artificial bees not required for the swarm groups 401 and 411 to remain in compliance with the execution plan) to re-populate swarm group 421.

Figure 4J:
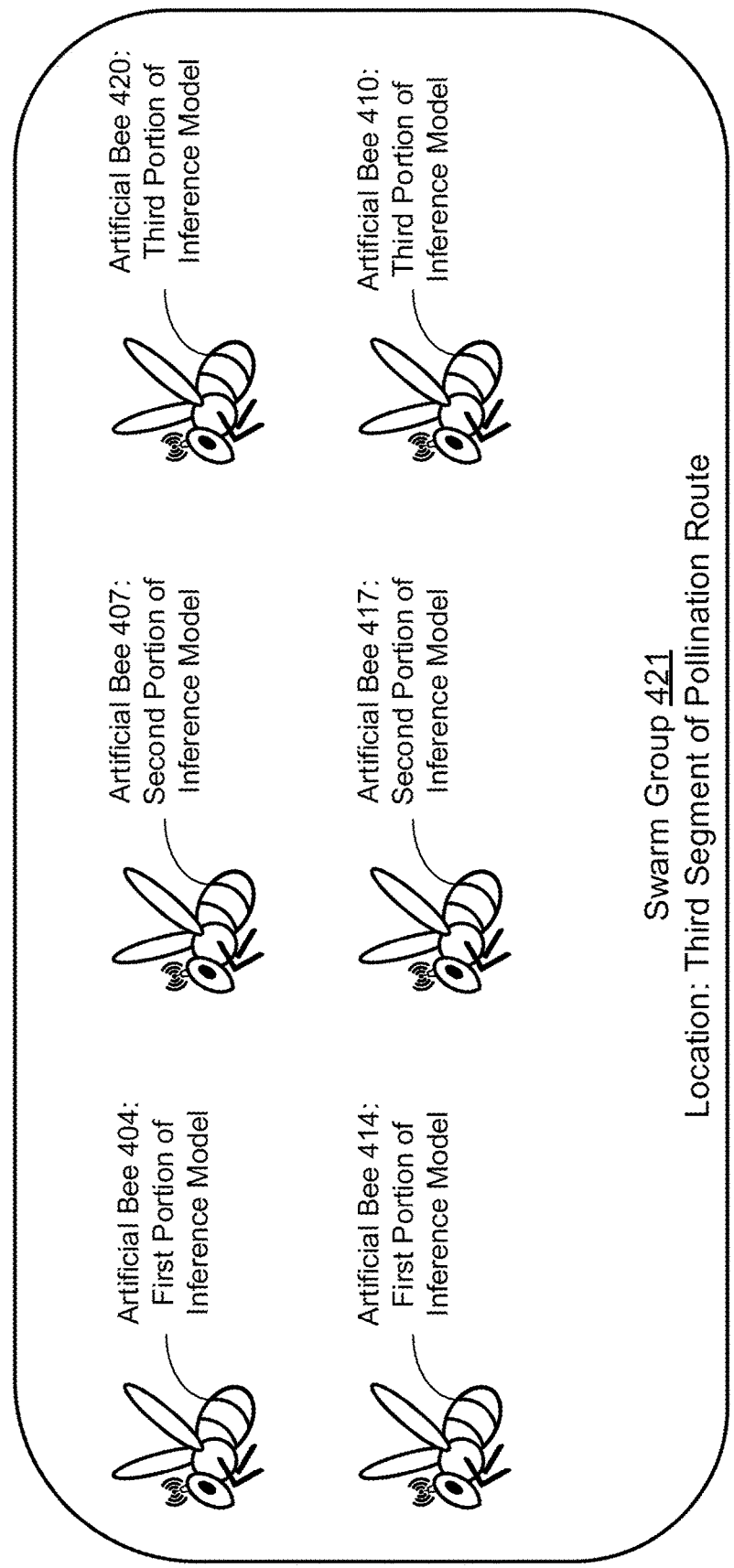

Turning to FIG. 4J, an updated assignment of the artificial bees in swarm group 421 is shown. Inference model manager 400 may re-locate artificial bee 404 from swarm group 401 and artificial bee 414 from swarm group 411 to the third segment of the pollination route. Artificial bee 404 may already host a copy of the first portion of the inference model. Artificial bee 414 may be unassigned and a copy of the first portion of the inference model may be distributed to artificial bee 414. Artificial bee 407 may host a copy of the second portion of the inference model and may be re-located from swarm group 401. Artificial bee 417 may host a copy of the second portion of the inference model and may be re-located from swarm group 41. Artificial bee 420 may host a copy of the third portion of the inference model and may be re-located from swarm group 411. Artificial bee 410 may be unassigned and may be re-located from swarm group 401. A copy of the third portion of the inference model may be distributed to artificial bee 410. By doing so, swarm group 421 may include two copies of each portion of the inference model in compliance with the execution plan. Inference model manager 400 may, therefore, compensate for a mass failure event via dynamic re-assignment and re-location of data processing systems throughout a distributed environment.

Thus, as illustrated in FIGS. 4A-4J, embodiments disclosed herein may provide for a distributed environment capable of providing distributed services as the membership of the distributed environment changes over time and/or unexpectedly. Consequently, embodiments disclosed herein may facilitate operation of distributed environments in challenging environments.

Figure 5:
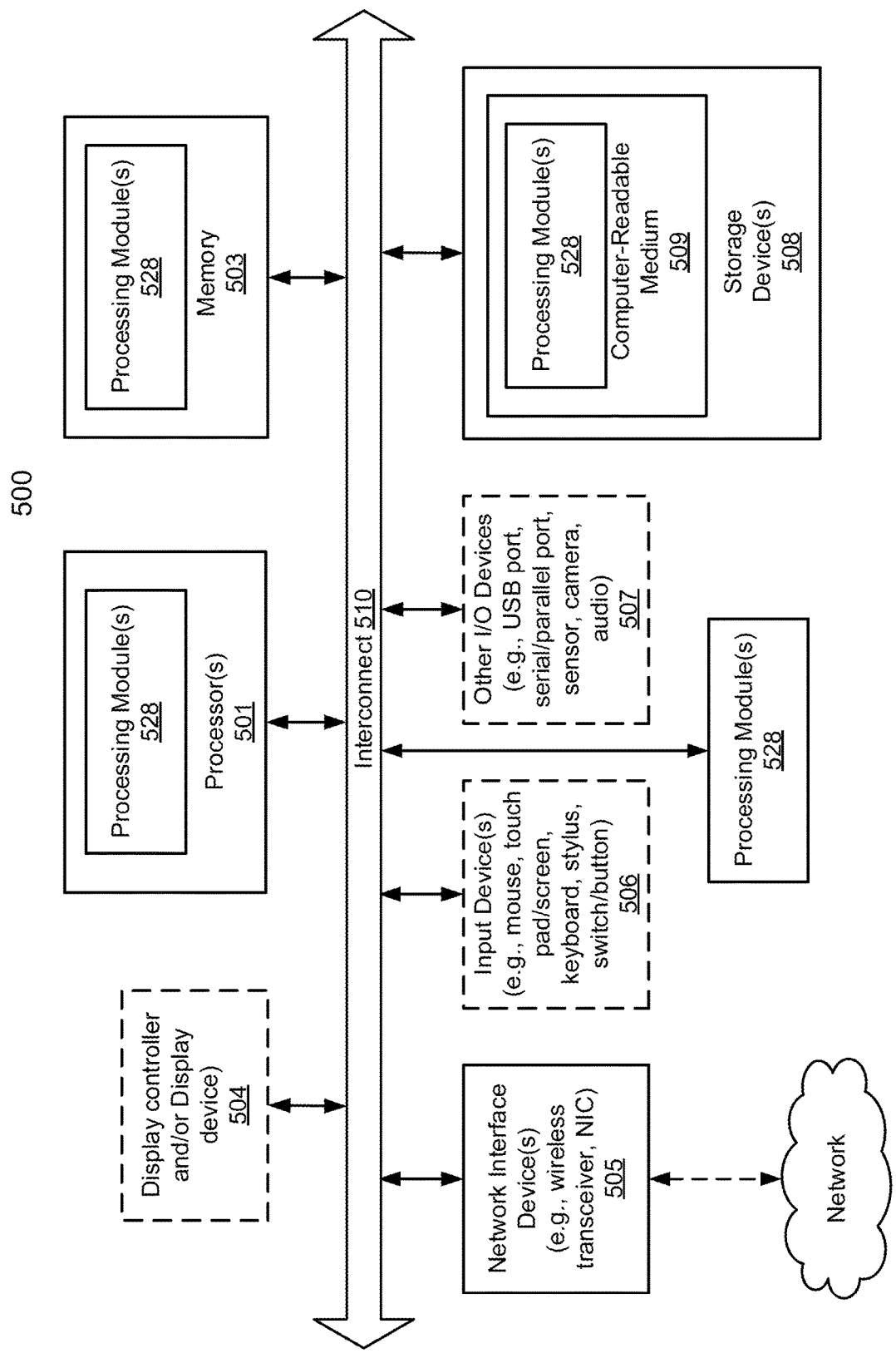
FIG. 5 shows a block diagram illustrating a data processing system in accordance with an embodiment.

Any of the components illustrated in FIGS. 1-4J may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/IOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICs, FPGAs, DSPs or similar devices. In addition, processing module/unit/logic 528 can be implemented as firmware or functional circuitry within hardware devices. Further, processing module/unit/ logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for executing an inference model across multiple data processing systems that each individually have insufficient computing resources to complete timely execution of the inference model, the method comprising:
   initiating execution of an inference model using portions of the inference model distributed to the data processing systems to obtain an inference model result, at least two of the portions of the inference model generating redundant processing results as specified by an execution plan for the inference model to facilitate continued execution of the inference model in an event of termination of a host of one of the at least two of the portions of the inference model; and
   while the inference model is executing and at least one of the data processing systems becomes unable to complete execution of one of the distributed portions of the inference model:
      managing the execution of the inference model based on the execution plan and through, at least in part, distribution of additional copies of the portions of the inference model to the data processing systems to provide eventual compliance with the execution plan and through which the inference model result is timely obtained, the timely obtained inference model result being relied upon by a downstream consumer for operation.

2. The method of claim 1, further comprising:
   prior to initiating the execution of the inference model:
      obtaining the inference model;
      identifying characteristics of the data processing systems;
      obtaining the portions of the inference model based on the characteristics of the data processing systems and characteristics of the inference model;
      obtaining the execution plan based on:
         the portions of the inference model,
         the characteristics of the data processing systems, and
         requirements of the downstream consumer with respect to the inference model result; and
      distributing the portions of the inference model to the data processing systems based on the execution plan.

3. The method of claim 2, wherein the execution plan indicates:
   an assurance level for each of the portions of the inference model; and
   an execution location for each of the portions of the inference model.

4. The method of claim 3, wherein the assurance level indicates a quantity of instances of a corresponding portion of the portions of the inference model that are to be hosted by the data processing systems.

5. The method of claim 3, wherein the execution location for each of the portions of the inference model is selected to reduce geographic clustering of redundant instances of the portions of the inference model.

6. The method of claim 3, wherein the execution plan further indicates:
   an acknowledgement schedule for the data processing systems.

7. The method of claim 3, wherein the execution plan further indicates:

a compliance standard for deviation of the portions of the inference model from the execution plan.

8. The method of claim 3, wherein the compliance standard indicates a maximum duration of time for the distribution of the additional copies of the portions of the inference model.

9. The method of claim 1, wherein managing the execution of the inference model comprises:
attempting to obtain an acknowledgement from each of the data processing systems to obtain an updated listing of a distribution and a quantity of the data processing systems;
making a determination regarding whether the updated listing of the distribution and the quantity of the data processing systems matches the execution plan; and
in an instance where the determination indicates that the updated listing does not match the execution plan:
obtaining a revised execution plan based on the updated listing, and
distributing one or more of the portions of the inference model based on the revised execution plan.

10. The method of claim 9, wherein the revised execution plan indicates a change in assignment of one of the data processing systems to support execution of the distributed one or more of the portions of the inference model.

11. A non-transitory machine-readable medium having instructions stored therein, which when executed by a processor, cause the processor to perform operations for executing an inference model across multiple data processing systems that each individually have insufficient computing resources to complete timely execution of the inference model, the operations comprising:
initiating execution of an inference model using portions of the inference model distributed to the data processing systems to obtain an inference model result, at least two of the portions of the inference model generating redundant processing results as specified by an execution plan for the inference model to facilitate continued execution of the inference model in an event of termination of a host of one of the at least two of the portions of the inference model; and
while the inference model is executing and at least one of the data processing systems becomes unable to complete execution of one of the distributed portions of the inference model:
managing the execution of the inference model based on the execution plan and through, at least in part, distribution of additional copies of the portions of the inference model to the data processing systems to provide eventual compliance with the execution plan and through which the inference model result is timely obtained, the timely obtained inference model result being relied upon by a downstream consumer for operation.

12. The non-transitory machine-readable medium of claim 11, wherein the operations further comprise:
prior to initiating the execution of the inference model:
obtaining the inference model;
identifying characteristics of the data processing systems;
obtaining the portions of the inference model based on the characteristics of the data processing systems and characteristics of the inference model;
obtaining the execution plan based on:
the portions of the inference model,
the characteristics of the data processing systems, and
requirements of the downstream consumer with respect to the inference model result; and
distributing the portions of the inference model to the data processing systems based on the execution plan.

13. The non-transitory machine-readable medium of claim 12, wherein the execution plan indicates:
an assurance level for each of the portions of the inference model; and
an execution location for each of the portions of the inference model.

14. The non-transitory machine-readable medium of claim 13, wherein the assurance level indicates a quantity of instances of a corresponding portion of the portions of the inference model that are to be hosted by the data processing systems.

15. The non-transitory machine-readable medium of claim 13, wherein the execution location for each of the portions of the inference model is selected to reduce geographic clustering of redundant instances of the portions of the inference model.

16. A data processing system, comprising:
a processor; and
a memory coupled to the processor to store instructions, which when executed by the processor, cause the processor to perform operations for executing an inference model across multiple data processing systems that each individually have insufficient computing resources to complete timely execution of the inference model, the operations comprising:
initiating execution of an inference model using portions of the inference model distributed to the data processing systems to obtain an inference model result, at least two of the portions of the inference model generating redundant processing results as specified by an execution plan for the inference model to facilitate continued execution of the inference model in an event of termination of a host of one of the at least two of the portions of the inference model; and
while the inference model is executing and at least one of the data processing systems becomes unable to complete execution of one of the distributed portions of the inference model:
managing the execution of the inference model based on the execution plan and through, at least in part, distribution of additional copies of the portions of the inference model to the data processing systems to provide eventual compliance with the execution plan and through which the inference model result is timely obtained, the timely obtained inference model result being relied upon by a downstream consumer for operation.

17. The data processing system of claim 16, wherein the operations further comprise:
prior to initiating the execution of the inference model:
obtaining the inference model;
identifying characteristics of the data processing systems;
obtaining the portions of the inference model based on the characteristics of the data processing systems and characteristics of the inference model;
obtaining the execution plan based on:
the portions of the inference model,
the characteristics of the data processing systems, and
requirements of the downstream consumer with respect to the inference model result; and distributing the portions of the inference model to the data processing systems based on the execution plan.

18. The data processing system of claim 17, wherein the execution plan indicates:
   an assurance level for each of the portions of the inference model; and
   an execution location for each of the portions of the inference model.

19. The data processing system of claim 18, wherein the assurance level indicates a quantity of instances of a corresponding portion of the portions of the inference model that are to be hosted by the data processing systems.

20. The data processing system of claim 18, wherein the execution location for each of the portions of the inference model is selected to reduce geographic clustering of redundant instances of the portions of the inference model.

* * * * *